US006896618B2

(12) United States Patent
Benoy et al.

(10) Patent No.: US 6,896,618 B2
(45) Date of Patent: May 24, 2005

(54) POINT OF PLAY REGISTRATION ON A GAMING MACHINE

(75) Inventors: Greg A. Benoy, Reno, NV (US); Binh T. Nguyen, Reno, NV (US); Craig A. Paulsen, Reno, NV (US)

(73) Assignee: IGT, Reno, NV (US)

( * ) Notice: Subject to any disclaimer, the term of this patent is extended or adjusted under 35 U.S.C. 154(b) by 129 days.

(21) Appl. No.: 09/957,742

(22) Filed: Sep. 20, 2001

(65) Prior Publication Data

US 2003/0054878 A1 Mar. 20, 2003

(51) Int. Cl.[7] ................................................ A63F 13/00
(52) U.S. Cl. ........................................... 463/25; 463/29
(58) Field of Search ....................... 463/25, 29, 40–42; 700/91–93

(56) References Cited

U.S. PATENT DOCUMENTS 5,643,086 A 7/1997 Alcorn et al. ................. 463/29
5,741,183 A 4/1998 Acres et al. .................. 463/42
5,761,647 A 6/1998 Boushy ....................... 705/10
5,770,533 A 6/1998 Franchi
5,833,540 A 11/1998 Miodunski et al. ........... 463/42
5,871,398 A * 2/1999 Schneier et al. .............. 463/16
5,951,397 A 9/1999 Dickinson .................... 463/36
5,954,583 A * 9/1999 Green ......................... 463/29
6,003,013 A 12/1999 Boushy et al. ................ 705/10
6,048,269 A 4/2000 Burns et al. .................. 463/25
6,089,975 A 7/2000 Dunn .......................... 463/16
6,104,815 A 8/2000 Alcorn et al. ............... 380/251
6,106,396 A 8/2000 Alcorn et al. ................. 463/29
6,113,495 A 9/2000 Walker et al. ................ 463/42
6,135,884 A * 10/2000 Hedrick et al. ............... 463/20
6,149,522 A 11/2000 Alcorn et al. ................. 463/29
6,162,122 A 12/2000 Acres et al. .................. 463/29
6,183,362 B1 2/2001 Boushy ....................... 463/25
6,210,279 B1 4/2001 Dickinson .................... 463/37
6,244,958 B1 6/2001 Acres .......................... 463/26
6,450,885 B2 * 9/2002 Schneier et al. .............. 463/29
6,561,903 B2 * 5/2003 Walker et al. ................ 463/25
2003/0083943 A1 5/2003 Adams et al.

FOREIGN PATENT DOCUMENTS

AU 199650576 4/1997
EP 0 769 769 A1 4/1997

OTHER PUBLICATIONS

Wang Z et al.; "Casino Technology: Player Tracking And Slot Accounting Systems" Gaming Research And Review Journal, UNLV International Gaming Institute, Las Vegas, NV, U.S. vol. 6, No. 1, 2000, pp. 43–56, XP001149561, ISSN: 1531–0930, the whole document.

* cited by examiner

*Primary Examiner*—John M. Hotaling, II
(74) *Attorney, Agent, or Firm*—Beyer, Weaver & Thomas LLP

(57) ABSTRACT

A disclosed gaming machine is used to provide a method of registering a player to a loyalty program such as a player tracking program at the gaming machine. At the gaming machine, the player or a casino service representative may enter identification information such as a name, an address and biometric information using an input mechanism located on the gaming machine or on a hand-held wireless device. The loyalty program information may be combined with information such as serial number or a bar-code read from a loyalty program instrument in a loyalty program registration request message sent to a loyalty program server such as a player tracking server. The loyalty program instrument may include a magnetic striped card, a smart card, a printed ticket, a room key, a cell-phone or a portable computing device. When the registration request is confirmed by the loyalty program server, the player may begin a loyalty program session on a gaming machine and earn loyalty points.

54 Claims, 14 Drawing Sheets

POINT OF PLAY REGISTRATION ON A GAMING MACHINE

BACKGROUND OF THE INVENTION

This invention relates to game playing methods for gaming machines such as video slot machines and video poker machines. More particularly, the present invention relates to methods and apparatus for providing player tracking services and related gaming services on a gaming machine.

There are a wide variety of associated devices that can be connected to a gaming machine such as a slot machine or video poker machine. Some examples of these devices are player tracking units, lights, ticket printers, card readers, speakers, bill validators, ticket readers, coin acceptors, display panels, key pads, coin hoppers and button pads. Many of these devices are built into the gaming machine or components associated with the gaming machine such as a top box which usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, such as button pads and levers, to determine the wager amount and initiate game play.

After game play has been initiated, the gaming machine determines a game outcome, presents the game outcome to the player and may dispense an award of some type depending on the outcome of the game. A game outcome presentation may utilize many different visual and audio components such as flashing lights, music, sounds and graphics. The visual and audio components of the game outcome presentation may be used to draw a players attention to various game features and to heighten the players interest in additional game play. Maintaining a game player's interest in game play, such as on a gaming machine or during other gaming activities, is an important consideration for an operator of a gaming establishment.

One related method of gaining and maintaining a game player's interest in game play are player tracking programs which are offered at various casinos. Player tracking programs provide rewards to players that typically correspond to the player's level of patronage (e.g., to the player's playing frequency and/or total amount of game plays at a given casino). Player tracking rewards may be free meals, free lodging and/or free entertainment. These rewards may help to sustain a game player's interest in additional game play during a visit to a gaming establishment and may entice a player to visit a gaming establishment to partake in various gaming activities.

In general, player tracking programs may be applied to any game of chance offered at a gaming establishment. In particular, player tracking programs are very popular with players of mechanical slot gaming machines and video slot gaming machines. In a gaming machine, a player tracking program is implemented using a player tracking unit installed in the gaming machine and in communication with a remote player tracking server. Player tracking units are usually manufactured as an after-market device separate from the gaming machine. Many different companies manufacture player tracking units as part of player tracking/accounting systems. These player tracking/accounting systems are used in most casinos. Most casinos utilize only one type of player tracking system (i.e. from one manufacturer) while the type of player tracking system varies from casino to casino.

Player tracking cards and player tracking programs have become a de facto marketing method of doing business at casinos. The programs allow a casino to identify and reward customers based upon their previous game play history. In particular, a goal of the casinos is to identify and then to provide a higher level of service to certain groups of players identified as especially valuable to the casinos. An incentive of a casino for providing these services is to generate "brand" loyalty, and thus, repeat business from its valued customers. For instance, players that visit the casino, on average, once a week may be deemed as "special" customers and the casino may desire to cultivate a "special" relationship with these customers. In general, the selection of gaming services offered to players via loyalty programs, such as player tracking programs, is increasing. Also, the gaming services offered to a the casino misses the opportunity to cultivate as a "special" relationship with the player.

A cardless tracking system has been developed where a player may register for a tracking account at a gaming machine. The cardless tracking system requires the player to select an account number and identification number and then later fill out a registration form stating their name, address and other required information and mail the registration form to a location for processing. In the cardless system, the account number and the identification number are entered with a key pad at the gaming machine to access the tracking system. The account number and the identification number must be remembered by the player to use the system.

Disadvantages of the cardless system approach are that the account number and PIN number are easily forgotten especially when a player's has multiple tracking accounts at different venues. Another disadvantage of the cardless system approach is that the two step method of requiring the player to mail in the registration form after registering on the gaming machine decreases the likely hood that the registration process will be successfully completed. For instance, the player may lose the registration form or forget to mail it in. Finally, the cardless approach is generally less secure because the player must visibly enter their account number and PIN number using a key pad at the gaming machine. Thus, it is fairly easy for someone to steal a player's account number and PIN number. Because the cardless approach is relatively insecure, the gaming services that may be provided with the cardless system are limited. For instance, it is unlikely that the capability to redeem tracking points at the gaming machine would be provided with the cardless system approach because it would be too easy for someone to steal another player's account number and PIN number and use the stolen numbers to redeem their tracking points.

In view of the above, it would be desirable to provide apparatus and methods that simplify the method of registering a player to a player tracking program.

SUMMARY OF THE INVENTION

This invention addresses the needs indicated above by providing a method of registering a player to a loyalty program such as a player tracking program at a gaming machine. At the gaming machine, the player or a casino service representative may enter identification information such as a name, an address and biometric information using an input mechanism located on a gaming machine, located on a hand-held wireless device or combinations thereof. The loyalty program information may be combined with information such as serial number or a bar-code read from a loyalty program instrument in a loyalty program registration request message sent to a loyalty program server such as a player tracking server. The loyalty program instrument may include a magnetic striped card, a smart card, a printed ticket, a room key, a cell phone or a hand-held computing device. When the registration request is confirmed by the loyalty program server, the player may use the loyalty program instrument to begin a loyalty program session on a gaming machine and earn loyalty points.

One aspect of the present invention provides a gaming machine. The gaming machine may be generally characterized as including: 1) a master gaming controller designed or configured to control one or more games played on the gaming machine and to execute gaming logic; 2) a first input mechanism for inputting loyalty program information; 3) a second input mechanism for reading loyalty program instrument information from a loyalty program instrument where the loyalty program information and the loyalty program instrument information are used to register a player in a loyalty program and 4) a communication interface for communicating with a loyalty program server. The one or more games played on the gaming machine may be selected from the group consisting of video slot games, mechanical slot games, video black jack games, video poker games, video keno games, video pachinko games, video card games, video games of chance and combinations thereof.

In particular, the first input mechanism may be a touch screen display located on the main display on the gaming machine, on a secondary display on the gaming machine or on a display located on a player tracking unit mounted to the gaming machine. The second input mechanism may be selected from the group consisting of a card reader, a bill validator, a ticket reader, a bar-code scanner, a wireless interface and combinations thereof. The gaming machine may also include a biometric input device such as a camera, a finger-print reader, a retinal scanner and a microphone.

In other embodiments, the gaming machine may include gaming logic for a) generating a registration request message to register the player to the loyalty program, b) sending the registration request message to the loyalty program server where the registration request message includes loyalty program information and loyalty program instrument information and c) receiving a registration reply message from the loyalty program server. The loyalty program information may be selected from the group consisting of a name, an address, biometric information, a signature, preference information and combinations thereof. The loyalty program instrument may be selected from the group consisting of a magnetic-striped card, a smart card, a ticket, a room key and a hand-held computing device where the loyalty program black jack games, video poker games, video keno games, video pachinko games, video card games, video games of chance and combinations thereof.

In particular, the first input mechanism may be a touch screen display located on the main display on the gaming machine, on a secondary display on the gaming machine or on a display located on a player tracking unit mounted to the gaming machine. The second input mechanism may be selected from the group consisting of a card reader, a bill validator, a ticket reader, a bar-code scanner, a wireless interface and combinations thereof. The gaming machine may also include a biometric input device such as a camera, a finger-print reader, a retinal scanner and a microphone.

In other embodiments, the gaming machine may include gaming logic for a) generating a registration request message to register the player to the loyalty program, b) sending the registration request message to the loyalty program server where the registration request message includes loyalty program information and loyalty program instrument information and c) receiving a registration reply message from the loyalty program server. The loyalty program information may be selected from the group consisting of a name, an address, biometric information, a signature, preference information and combinations thereof. The loyalty program instrument may be selected from the group consisting of a magnetic-striped card, a smart card, a ticket, a room key and a hand-held computing device where the loyalty program instrument information stored on the loyalty program instrument is at least one of a bar-code and a serial number. Finally, the loyalty program may be a player tracking program.

Another aspect of the present invention provides a loyalty program registration system. The loyalty program registration may be generally characterized as including: 1) a loyalty program server; 2) a plurality of gaming machines, 3) one or more handheld wireless devices, 4) a network designed or configured to allow at least communication between the plurality of gaming machines and the loyalty program server and the one or hand-held wireless devices and the loyalty program server; and 5) gaming logic for generating a registration request message and sending the registration request message to the loyalty program server from at least one of the gaming machines and the one or hand-held wireless devices where the registration request message is used to register a player in a loyalty program. The loyalty program server may be a player tracking server and the loyalty program may be a player tracking program.

Another aspect of the present invention provides a method of registering a player to a loyalty program at a gaming machine used to play one or more games of chance. The method may be generally characterized as including: 1) detecting a request to register a player to a loyalty program at the gaming machine; 2) receiving loyalty program information; 3) receiving loyalty program instrument information stored on a loyalty program instrument at the gaming machine; and 4) sending a registration request message with the loyalty program information from the gaming machine to a loyalty program server where the loyalty program information and the loyalty program instrument information is used to register the player in the loyalty program.

In particular embodiments, the loyalty program information may a name, an address, biometric information or combinations thereof where the biometric information may be a finger print, a voice print, a picture, retinal scan or a signature. The loyalty program may be a player tracking program and the loyalty program server may be a player tracking server. The loyalty program instrument may be selected from the group consisting of a magnetic-striped card, a smart card, a ticket, a room key and a hand-held computing device where the loyalty program instrument information stored on the loyalty program instrument is at least one of a bar code and a serial number. The game of chance may be selected from the group consisting of video slot games, mechanical slot games, video black jack games, video poker games, video keno games, video bingo games, video pachinko games, video card games, a video games of chance and combinations thereof.

In other embodiments, the method may also include one or more of the following: a) encrypting the registration request, b) receiving a registration reply message, c)

decrypting the registration reply message, d) when the registration reply contains information confirming the registration request, initiating a loyalty program session on the gaming machine using the loyalty program instrument, e) displaying a registration interface to a touch screen display and receiving loyalty program information using a touch screen mounted over the touch screen display where the touch screen display is a main display on the gaming machine, a secondary display on the gaming machine or a display located on a player tracking unit, f) generating a receipt, g) displaying a message confirming the registration request, h) displaying a message denying the registration request, h) receiving a wager for a game of chance and presenting the game of chance on the gaming machine and i) generating a registration request message.

Another aspect of the prevent invention provides a method of registering a player to a loyalty program using a gaming device. The method may be generally characterized as including: 1) receiving loyalty program information on the gaming device; 2) receiving loyalty program instrument information stored on a loyalty program instrument on the gaming device; 3) sending a registration request message with the loyalty program information from the gaming device to a loyalty program server where the loyalty program information and the registration information is used to register the player in the loyalty program. The gaming device may be at least one of a casino kiosk, a player tracking unit and a hand-held gaming device. The method may also include displaying a registration interface to a touch screen display on the gaming device and receiving loyalty program information using a touch screen mounted over the touch screen display.

Another aspect of the present invention provides a method of registering a player to a loyalty program in a loyalty program server. The method may be generally characterized as including: 1) receiving a registration request message containing loyalty program information and loyalty program instrument information from a gaming machine; 2) generating a new loyalty program account using the loyalty program information and the loyalty program instrument information; and 3) sending a registration reply message to the gaming machine. The method may also include one or more of the following: a) assigning a personal identification number to the player, b) storing the loyalty program information and the loyalty program instrument information in a loyalty program account, c) generating the registration reply message, d) encrypting the registration reply message, e) decrypting the registration request message, f) receiving loyalty program information from a gaming machine for the new loyalty program account; determining loyalty points using the loyalty program information; and storing the loyalty points to the new loyalty program account.

Yet another aspect of the present invention provides a loyalty program server. The loyalty program server may be generally characterized as including: 1) a processor for executing gaming logic; 2) a network interface for communication with a plurality of gaming devices; 3) a database containing a plurality of loyalty program accounts; 4) gaming logic for receiving a loyalty program registration request message from the plurality of gaming machine and the plurality of gaming devices; and 5) gaming logic for generating a new loyalty program account on the database using loyalty program information and loyalty program instrument information received in the loyalty program request message. The gaming device may be selected from the group consisting of a gaming machine, a player tracking unit, a casino kiosk and a hand-held computing device, the network interface may be at least one of a wireless network interface, a wire network interface or combinations and the loyalty program instrument information is from a loyalty program instrument selected from the group consisting of a magnetic-striped card, a smart card, a ticket, a room key, a hand-held computing device.

Another aspect of the invention pertains to computer program products including a machine-readable medium on which is stored program instructions for implementing any of the methods described above. Any of the methods of this invention may be represented as program instructions and/or data structures, databases, etc. that can be provided on such computer readable media such as smart card, compact flash memory card, memory stick, RAM, CD-ROM, CD-DVD, hard drive, etc.

These and other features and advantages of the invention will be spelled out in more detail below with reference to the associated drawings.

DESCRIPTION OF THE PREFERRED EMBODIMENTS

Figure 1:
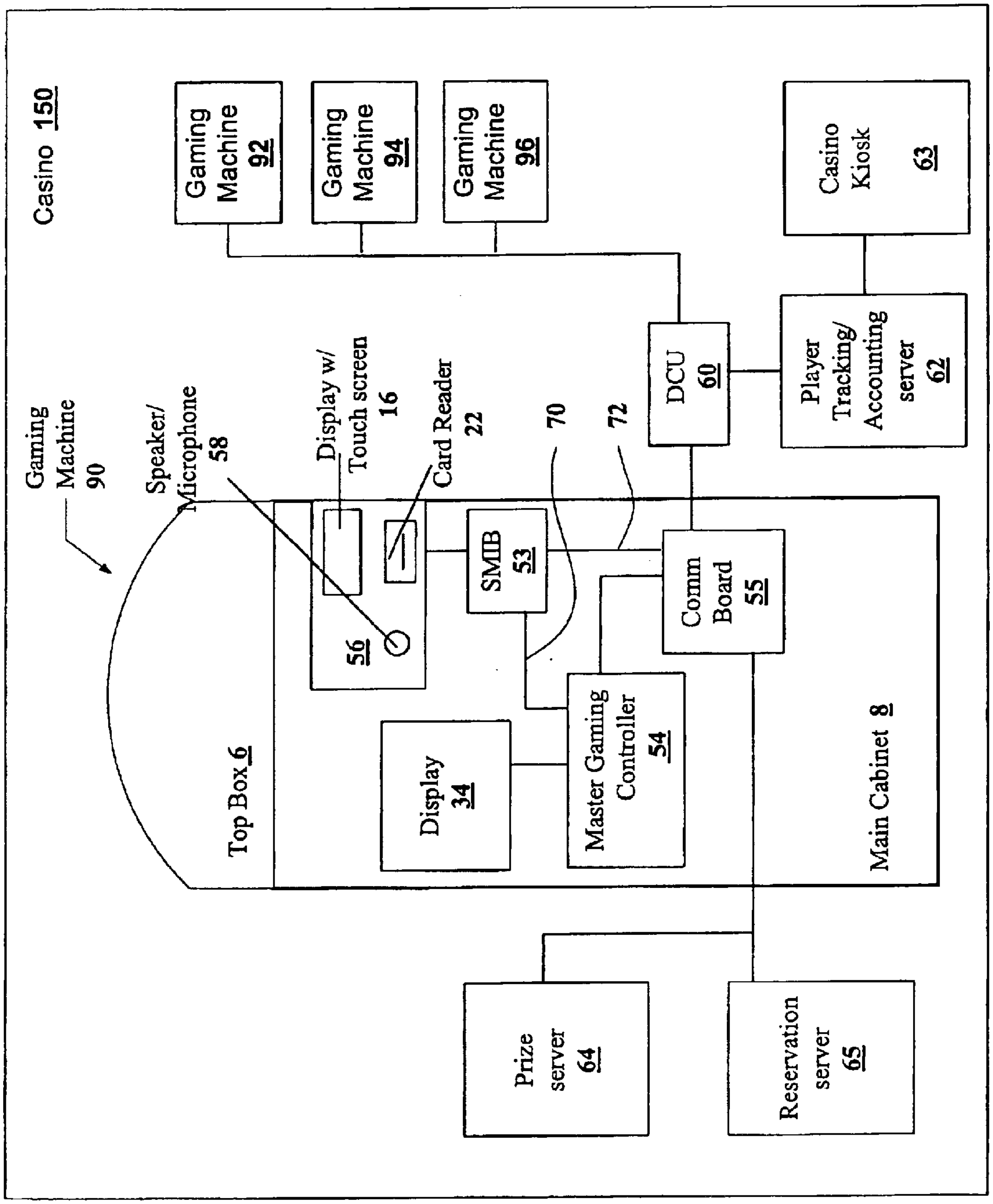
FIG. 1 is a block diagram of a number of gaming machines with player tracking units connected to servers providing gaming services and player tracking services.

In the present invention as shown in FIG. 1, a touch screen display 16 may be used as an interface to provide player tracking services and to provide other game services to a player playing a game on a gaming machine. More specifically, the touch screen display 16 may be used as an interface by a player to: 1) input player tracking identification information, 2) view account information and perform account transactions for accounts such as player tracking accounts and bank accounts, 3) receive operating instructions related to the player tracking unit and the gaming machine, 4) redeem prizes or comps including using player tracking points to redeem the prize or comp, 5) make entertainment service reservations, 6) transfer credits to cashless instruments and other player accounts, 7) participate in casino promotions, 8) select entertainment choices for output via video and audio output mechanisms on the player tracking unit and the gaming machine, 9) play games and bonus games, 10) request gaming services such as a drink orders, 11) communicate with other players or casino service personnel and 12) register a player for a loyalty program such as a player tracking program. In addition, the touch screen display 16 may be used as an interface by casino service personnel to: a) access diagnostic menus, b) display player tracking unit status information and gaming machine status information, c) access gaming machine metering information and d) display player status information.

In the present invention, to provide the game services described above, game service interfaces are used that may be implemented with the touch screen display 16. Concepts important to many embodiments of this invention include "loyalty points," "loyalty programs," "loyalty point sessions," and "loyalty program instruments." For instance, many of the described game service interfaces are utilized to provide game services associated with a loyalty program.

Loyalty points refers to any type of points accrued for participating in designated activities at a gaming establishment. Establishments where loyalty points may be accrued include casinos, hotels where gaming activities are provided, stores where gaming activities are permitted, Internet-based gaming activities, and the like. Designated activities include, but are not limited to, gaming activities such as playing gaming machines, card games such as black jack, pai gow poker, baccarat and poker, betting on public event outcomes, table games such as roulette, craps, keno and lotteries, etc. Other patronage activities at gaming establishments may accrue loyalty points. As indicated above, loyalty points represent a form of credit accrued for patronage. The points can be redeemed for a variety of goods or services (or translated to other forms of credit) within a gaming establishment or affiliated establishment. Player tracking points are a typical example of "loyalty points."

The administration and tracking of loyalty points is usually provided in a loyalty program. As described above, the primary goal of a loyalty program is to generate "brand" loyalty for a particular casino or group of casinos. A player tracking program or slot club are examples of loyalty programs. A participant in a loyalty program may be awarded with "comps" such as free drinks, free meals, free entertainment and other game services according to their level of participation in the loyalty program.

To participate in a loyalty program, a participant is generally required to join the program. In one embodiment of the present invention, a method is described that allows a player to join a loyalty program at a gaming machine. After joining, the participant is usually presented with a loyalty program instrument. The loyalty program instrument typically contains information that allows a member to accrue loyalty points during designated program activities. For example, for most slot clubs, a player is required to insert a magnetic striped card (i.e. a player tracking card) into the gaming machine before player tracking point points are accrued for the player. Examples of loyalty program instruments include a magnetic striped card, a smart card and a portable wireless device. However, in general, a loyalty program instrument may be any device that carries the information necessary for a player to participate in a loyalty program. For instance, a printed ticket with a bar code, plastic card with a bar code or a room key encoding player tracking information may be used as loyalty program instrument. The bar-coded ticket may be read when inserted into a bill validator on the gaming machine to obtain the necessary player tracking information or from a bar-code scanner located on the gaming machine.

Loyalty point sessions are sessions during which a person is performing the designated activity and during which loyalty points accrue. Loyalty point sessions may be delineated by a first event and a second event. The events are usually dependent on the type of loyalty point instrument employed and the designated loyalty program activity. For instance, in a loyalty program session on a gaming machine where a magnetic-striped player tracking card is used for the loyalty program instrument, the insertion of the card into a card reader on the gaming machine and the removal of the card from the card reader may delineate the beginning and end of the loyalty program session. As another example, in a loyalty program session on a gaming machine where a bar-coded ticket is used for the loyalty program instrument, the insertion of the ticket into a bill-validator and a "cash-out" on the gaming machine may delineate the beginning and end of the loyalty program session.

Figure 5:
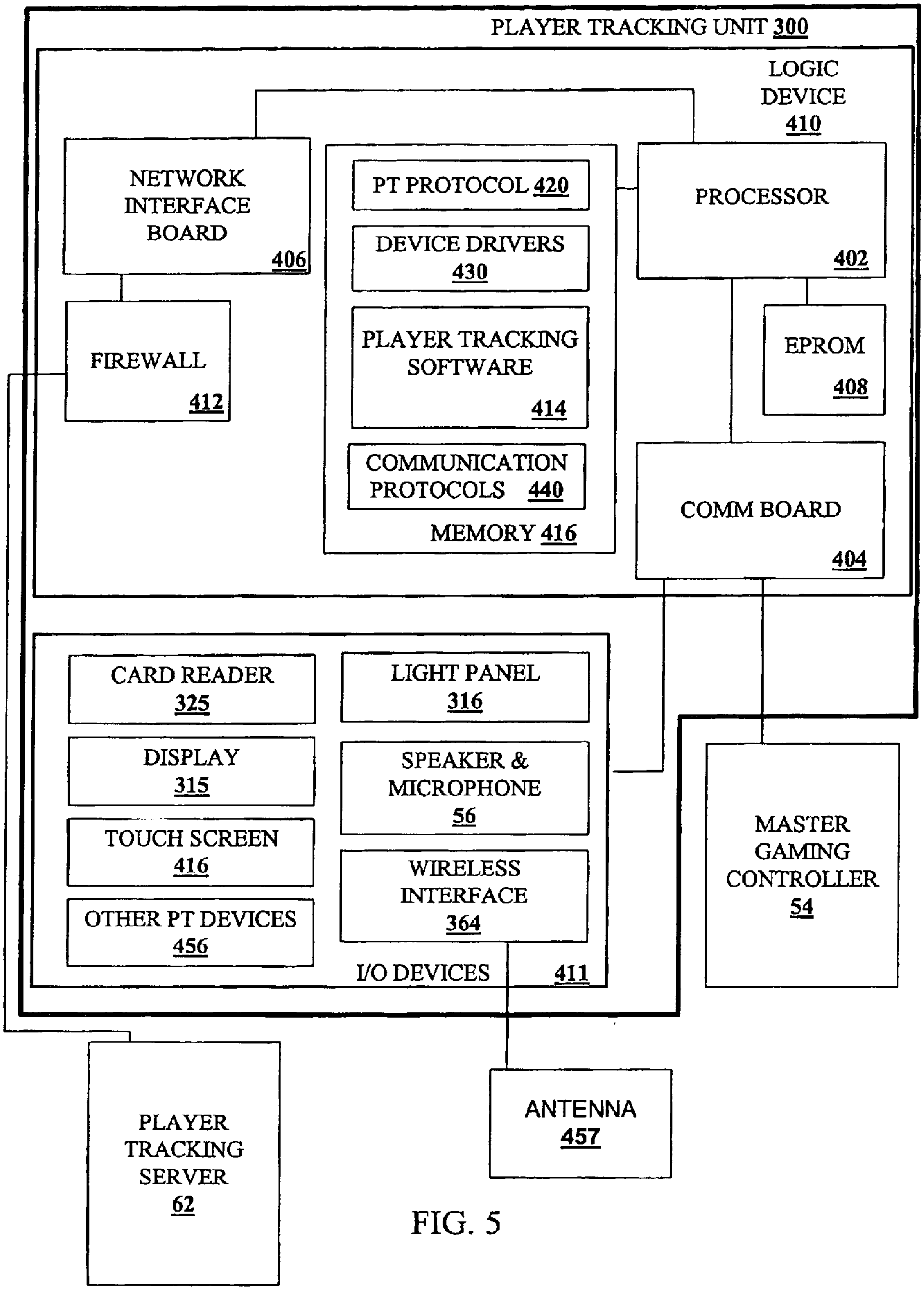
FIG. 5 is a block diagram of the components of a player tracking unit of the present invention.
Figure 6:
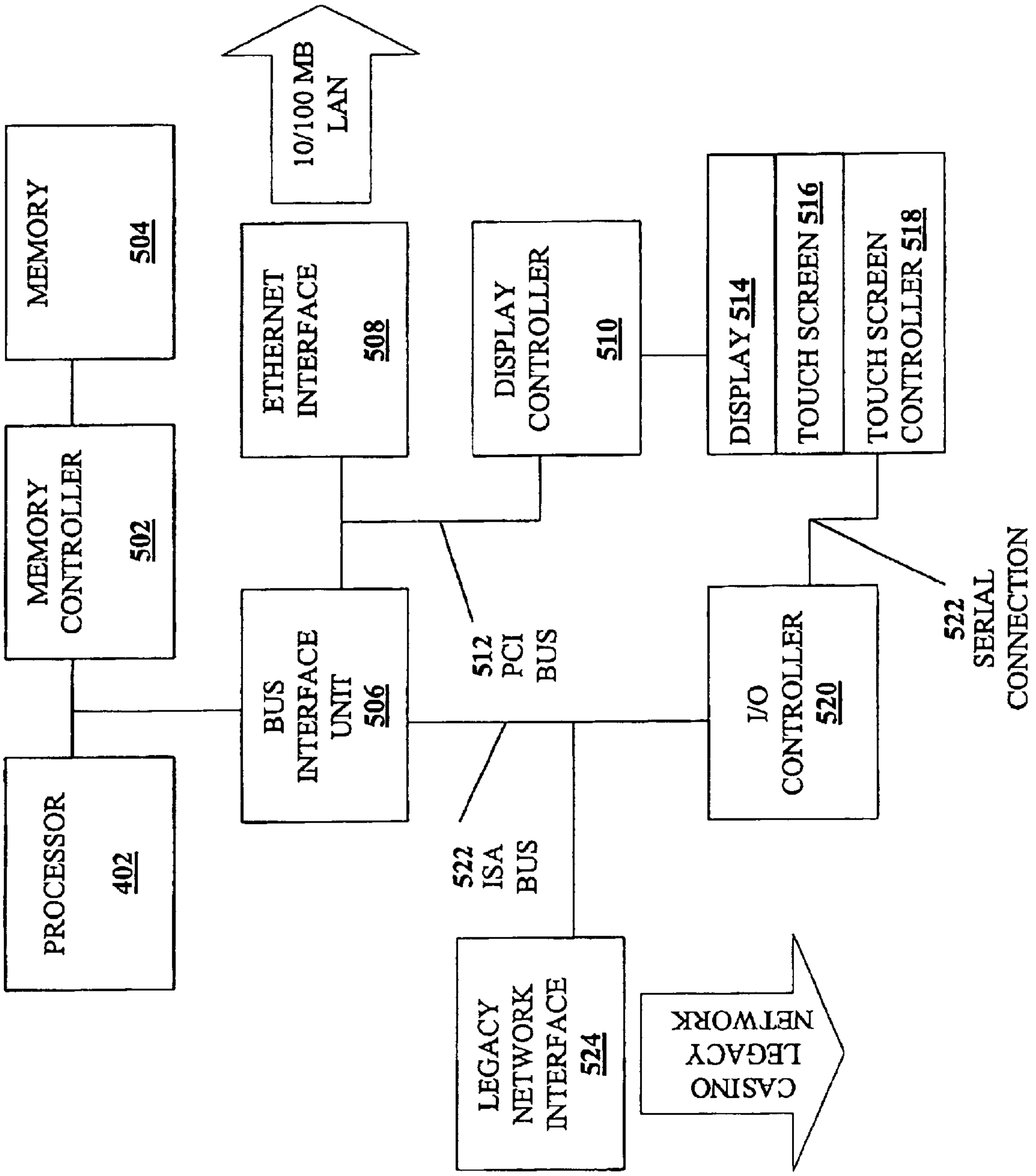
FIG. 6 is a block diagram of processor board with a touch screen display in a player tracking unit for one embodiment of the present invention.
Figure 7:
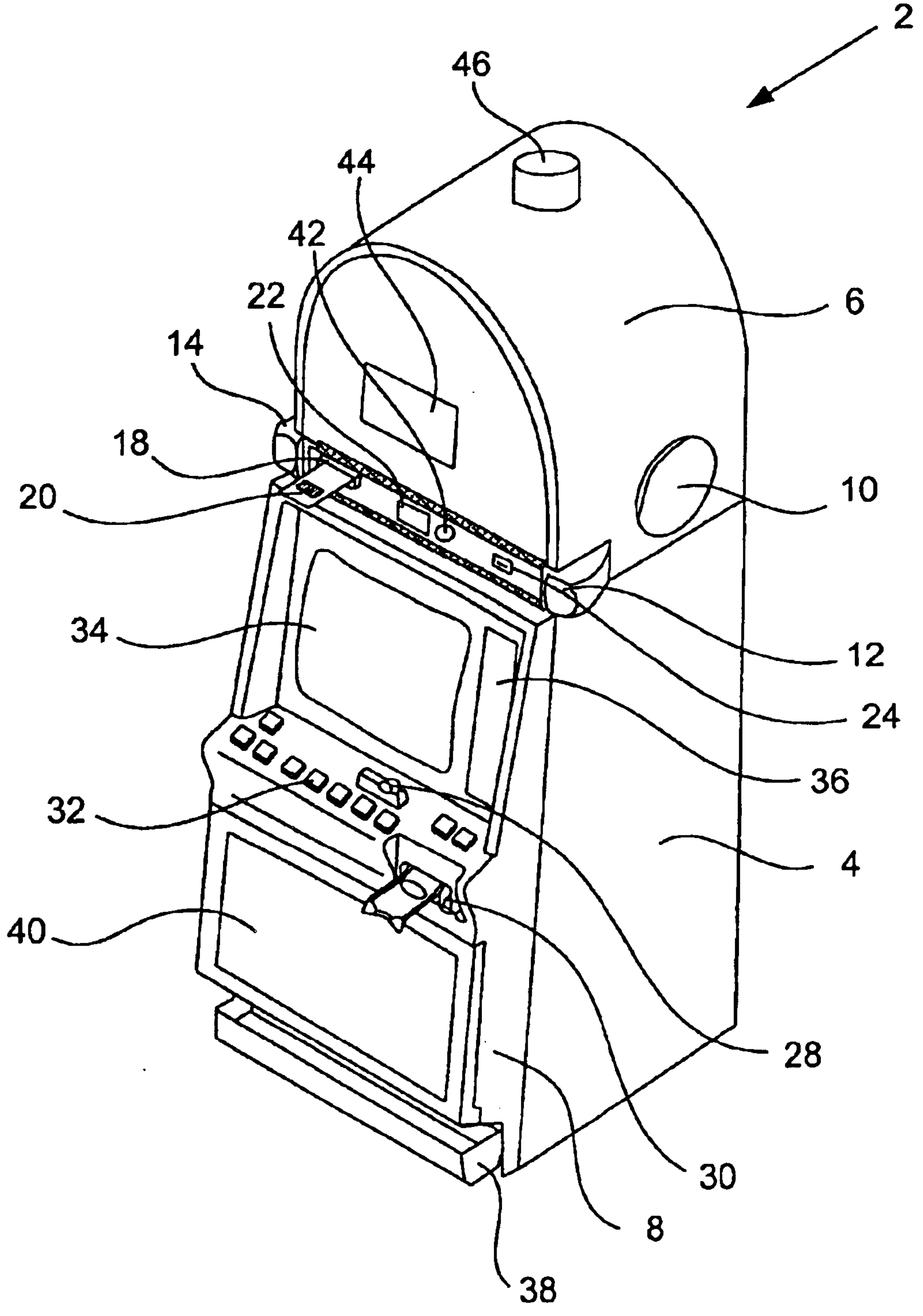
FIG. 7 is a perspective drawing of a video gaming machine of the present invention.
Figure 9:
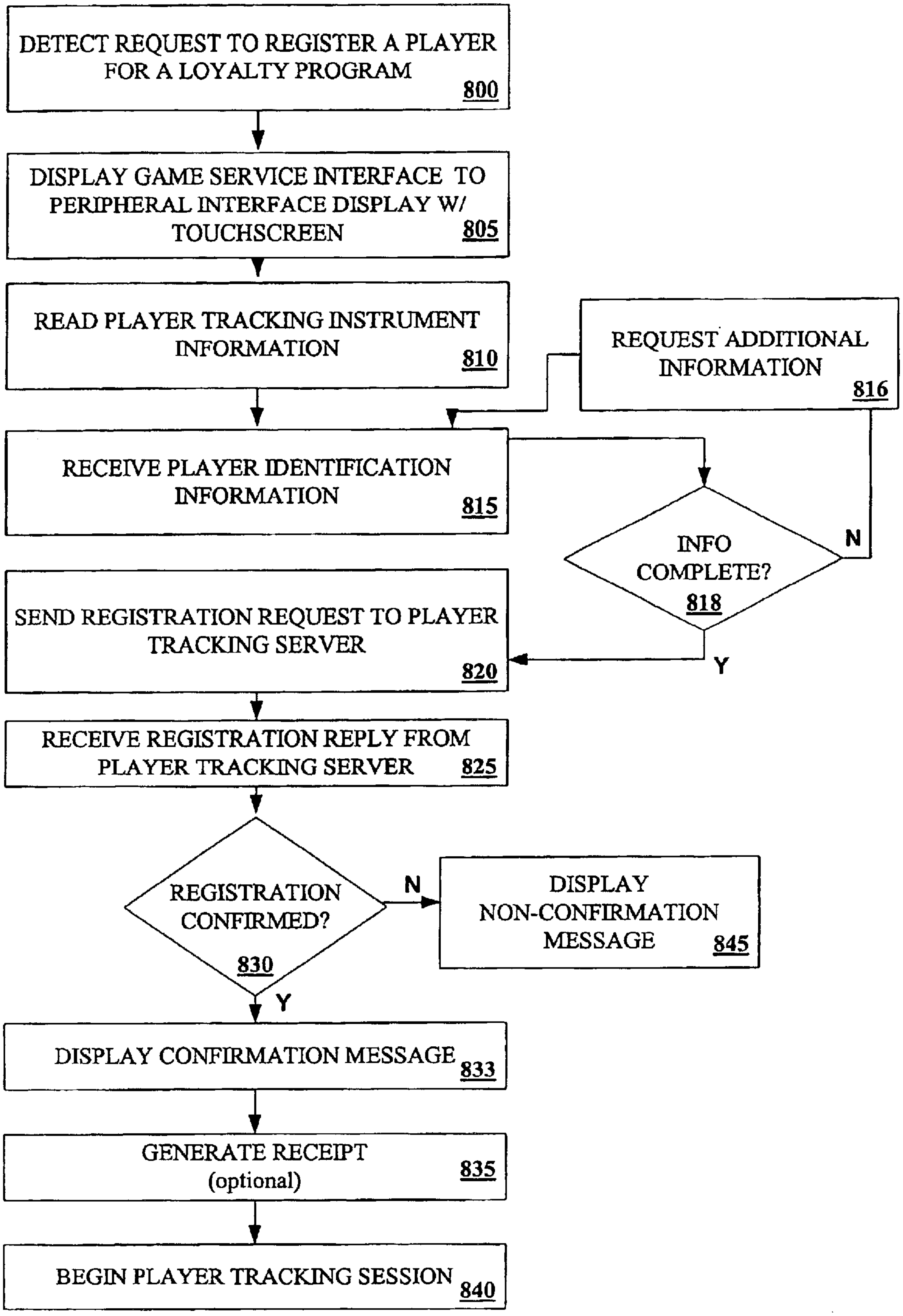
FIG. 9 is a flow chart of a method for providing a "point of play" loyalty program registration on a gaming machine of the present invention.
Figure 10:
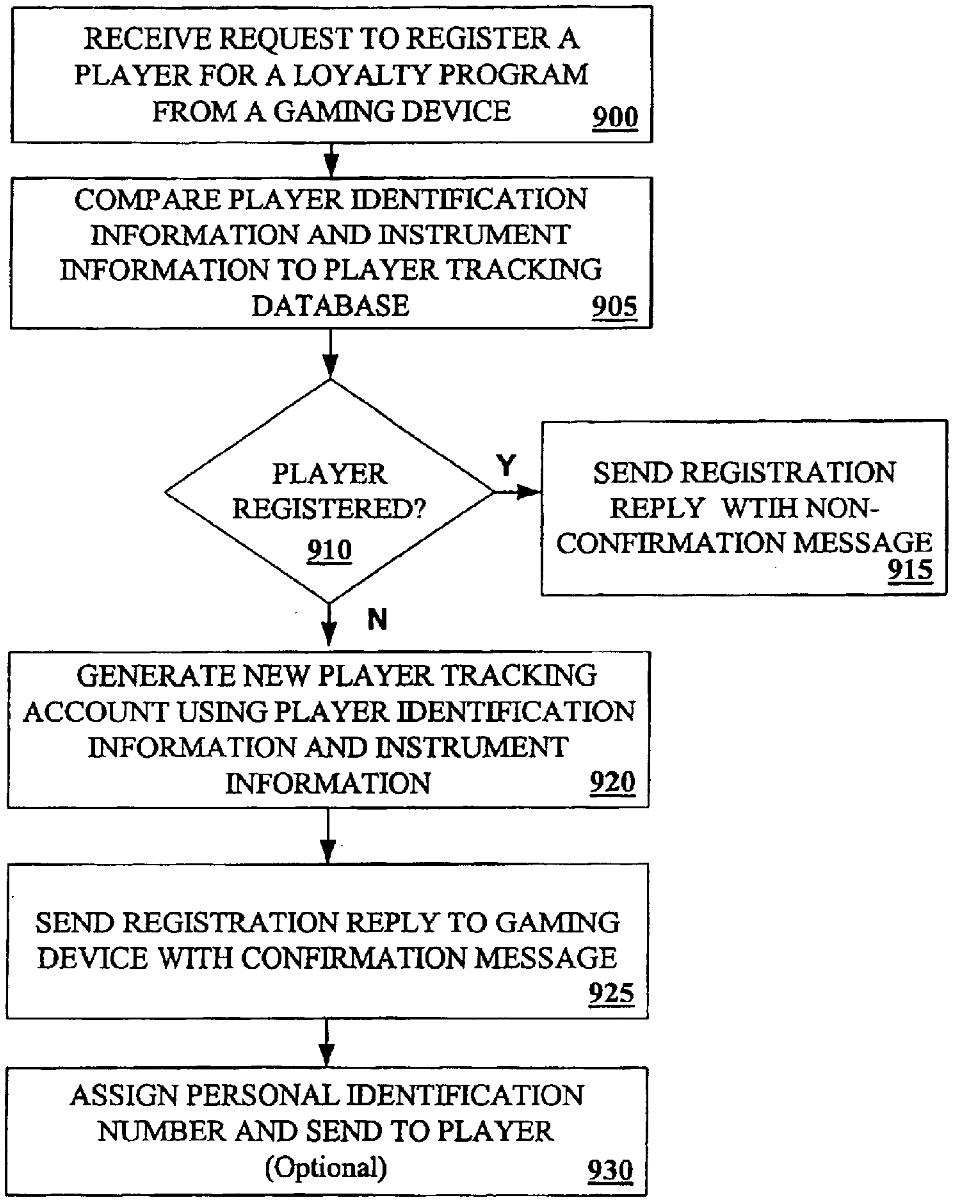
FIG. 10 is a flow chart of a method for providing a "point of play" loyalty program registration on a player tracking server of the present invention.

In FIG. 1, an embodiment of a player tracking system which may be used as part of loyalty program is described. In FIGS. 2A–2D, 3A–3E and 4A and 4B, display and touch screen devices (FIGS. 2A–2D), examples of game service interfaces that may be implemented with touch screen devices (FIGS. 3A–3D) and player tracking units incorporating the display and touch screen devices (4A–4D) are described. In FIGS. 5 and 6 block diagrams of player tracking units incorporating the display and touch screen devices of the present invention are described. In FIG. 7, the operation of a gaming machine with the present invention is described. Finally, in FIG. 8, a method of using game service interfaces on the gaming machine is described. In FIG. 9, a method of registering a player for a loyalty program at a gaming machine is described. In FIG. 10, a method, implemented on a player tracking server, of registering a player for loyalty program is described.

Returning to FIG. 1, an example of a player tracking system using an embodiment of the present invention is described. However, the example is presented for illustrated purposes only as the present invention is not limited to the following example. FIG. 1 is a block diagram of a number of gaming machines with player tracking units connected to servers providing player tracking services and servers providing other gaming services. In casino 150, gaming machines 90, 92, 94 and 96 are connected, via the data collection unit (DCU) 60 to the player tracking/accounting server 62. The DCU 60, which may be connected to up to 32 player tracking units as part of a local network in a particular example, consolidates the information gathered from player tracking units in gaming machines 90, 92, 94 and 96 and forwards the information to the player tracking account server 62. The player tracking account server is designed 1) to store player tracking account information, such as information regarding a player's previous game play, and 2) to calculate player tracking points based on a player's game play. The player tracking points may be used as basis for providing rewards to the player.

In gaming machine 92 of casino 150, a player tracking unit 56 and slot machine interface board (SMIB) 53 are mounted within a main cabinet 8 of the gaming machine. A top box 130 is mounted on top of the main cabinet 8 of the gaming machine. In many types of gaming machines, the player tracking unit is mounted within the top box 6. The player tracking unit 56 may also be mounted on the side of a gaming machine such as on the side of main cabinet 8. Usually, player tracking units, such as 56, and SMIBs, such as 53, are manufactured as separate units before installation into a gaming machine, such as 92.

The player tracking unit 56 includes three peripheral devices, a card reader 24, a speaker and microphone 58, and the touch screen display 16, all mounted within the unit. In some embodiments of the present invention, the peripheral devices within the player tracking unit are controlled by a processor (see FIG. 5) located within the player tracking unit. In other embodiments, one or more peripheral devices may be directly controlled by the master gaming controller 54. In yet other embodiments, the processor in the player tracking unit 56 may be used as a slave controller by the master gaming controller 54 to operate one or more peripheral devices in the player tracking unit 56. Details of player tracking units with peripheral devices operated by a master gaming controller are described in co-pending U.S. patent application Ser. No. 09/838,033, filed Apr. 19, 2001, by Criss-Puskiewicz, et al, titled "Universal Player Tracking System," which is incorporated herein in its entirety and for all purposes and co-pending U.S. patent application Ser. No. 09/642,192, filed Aug. 18, 2000, by LeMay, et al, titled "Gaming Machine Virtual Player Tracking Services," which is incorporated herein in its entirety and for all purposes.

The player tracking devices are used to input player tracking information that is needed to implement the player tracking program. The player tracking devices may be mounted in many different arrangements depending upon design constraints such as accessibility to the player, packaging constraints of a gaming machine and a configuration of a gaming machine. For instance, the player tracking devices may be mounted flush with a vertical surface in an upright gaming machine and may mounted flush with a horizontal surface in a table top gaming machine.

In one embodiment, the player tracking unit 56 may communicate with the player tracking server 60 via the SMIB 53, a main communication board 55 and the data collection unit 60. The SMIB 53 allows the player tracking unit 56 to gather metering information from the gaming machine 92 such as an amount a player has wagered during a game play session. This information may be used by the player tracking server to calculate player tracking points for the player. In another embodiment, the master gaming controller 54 may communicate with the player tracking and accounting server via the communication board 55 and the DCU 60 to send metering information to the server 62.

The player tracking unit 56 is usually connected to the master gaming controller 54 via a serial connection using a wire serial connector and communicates with the master gaming controller 54 using a serial communication protocol. The serial connection between the SMIB 53 and the master gaming controller 54 may be through the main communication board 55 (e.g. through connections 72), through another intermediate device or through a direct connection 70 to the master gaming controller 54. As an example of a serial communication protocol, the master gaming controller 54 may employ a subset of the proprietary Slot Accounting System (SAS protocol) developed by International Game Technology of Reno, Nev. to communicate with the player tracking unit 56.

In some embodiments, proprietary serial connector hardware and proprietary communication protocols may be used for communication between gaming devices within the gaming machine. For instance, Netplex, a proprietary serial communication protocol developed by International Game Technology (IGT, Reno, Nev.), may be used for communication between the peripheral devices, including the speaker/microphone 56, the display w/touch screen 16 and the card reader 24, and a processor on the player tracking unit 56 or communication between the master gaming controller 54 and the peripheral devices. In other embodiments, serial communication between the peripheral devices and a processor on the player tracking unit 56 or the master gaming controller 54 may be provided using non-proprietary industry standard connection hardware and standard communication protocols such as USB, IEEE 1394, Firewire, RS-232, PS/2, IrDA and the like.

In other embodiments of the present invention, serial communication between various gaming devices may be provided using wireless communication hardware and protocols or combinations of wire and wireless communication hardware and communication protocols. For example, the player tracking unit 56 may communicate with the master gaming controller 54 and a local area network connected to the player tracking and accounting server 62 using a wireless communication protocol such as a Bluetooth, IrDA, IEEE 802.11a, IEEE 802.11b, IEEE 802.11x (e.g. other IEEE 802.11 standards such as IEEE 802.11c, IEEE 802.11d, IEEE 802.11e, etc.), hiperlan/2, and HomeRF. Thus, a player tracking unit, such as 56, may be installed in gaming machines 90, 92, 94 and 96 without having to wire it to the gaming machine. In other embodiments, the master gaming controller 54 may communicate with a slave processor on the player tracking unit 56 or directly with peripheral devices such as the display with touch screen 16, the card reader 24 and the speaker/microphone 58 using a wireless communication system such as Bluetooth, IrDA, IEEE 802.11a, IEEE 802.11b, IEEE 802.11x (e.g. other IEEE 802.11 standards such as IEEE 802.11c, IEEE 802.11d, IEEE 802.11e, etc.), hiperlan/2, and HomeRF. In yet another embodiment, the peripheral devices, such as the touch screen display 16, may communicate with a processor on the player tracking unit 56 via a wire communication system such as USB but may also communicate with the master gaming controller 54 via a wireless communication protocol such as Bluetooth, IrDA, IEEE 802.11a, IEEE 802.11b, IEEE 802.11x (e.g. other IEEE 802.11 standards such as IEEE 802.11c, IEEE 802.11d, IEEE 802.11e, etc.), hiperlan/2, and HomeRF.

Typically, when a game player wants to play a game on a gaming machine and utilize the player tracking services available through the player tracking unit, a game player inserts a player tracking card, such as a magnetic striped card, into the card reader 24. After the magnetic striped card has been so inserted, the player tracking unit 56 may detect this event and receive certain identification information contained on the card. For example, a player's name, address, and player tracking account number encoded on the magnetic striped card, may be received by the player tracking unit 56. In general, a player must provide identification information of some type to utilize player tracking services available on a gaming machine. For current player tracking programs, the most common approach for providing identification information is to issue a magnetic-striped card storing the necessary identification information to each player that wishes to participate in a given player tracking program. In FIGS. 3E, 9 and 10, a method of allowing a new player without a player tracking card to register for a player tracking program, using a "blank" magnetic striped card or other loyalty program instrument at a gaming machine is described.

After a player has inserted her or his player tracking card into the card reader 24, the player tracking unit 56 may command the touch screen display 16 to display the game player's name on the touch screen display 16 and also, may optionally display a message requesting the game player to validate their identity by entering an identification code using a game service interface with an alpha-numeric key pad displayed on touch screen display 16. The player may use their finger, a stylus or combinations thereof to enter their identification information using the touch screen sensor. Once the game player's identity has been validated, the player tracking information is relayed to the player tracking server 62. Typically, the player tracking server 62 stores player tracking account records including the number of player tracking points previously accumulated by the player.

During game play on the gaming machine, the player tracking unit 56 may poll the master gaming controller 54 for game play information such as how much money the player has wagered on each game, the time when each game was initiated and the location of the gaming machine. The game play information is sent by the player tracking unit 56 to the player tracking server 62. While a player tracking card is inserted in the card reader 24, the player tracking server 62 may use the game play information provided by the player tracking unit 56 to generate player tracking points and add the points to a player tracking account identified by the player tracking card. The player tracking points generated by the player tracking server 62 are stored in a memory of some type on the player tracking server.

To provide additional services to a game player the player tracking unit 56 and/or the master gaming controller may communicate with other remote servers, such as the prize server 64, a reservation server 65, a bonus server (not shown). The servers may reside on a local area network or may reside on remote networks that are accessible to the gaming machine 90 via the Internet. Information from these remote servers may be used to provide gaming services to a player playing a game on the gaming machine 90 using the touch screen display 16 as a peripheral interface device. For example, a prize server, such as 64, may be used to redeem a prize won by the player on the gaming machine, i.e. to have the prize shipped to the player's address. As another example, the reservation server 65 may be used by the player to make a dinner or entertainment reservation using the touch screen display 16. An embodiment of a game service interface for making an entertainment reservation that may be used with the touch screen display 16 is described in more detail with respect to FIG. 3C. An embodiment of a game service interface for redeeming a prize that may be used with the touch screen display is described with respect to FIG. 3D. Additional details of providing prizes and prize redemption on a gaming machine are described in co-pending U.S. patent application Ser. No. 09/515,717, filed Feb. 29, 2000 and entitled "Name Your Prize Game Playing Methodology," which is incorporated herein in its entirety and for all purposes.

Figure 2A:
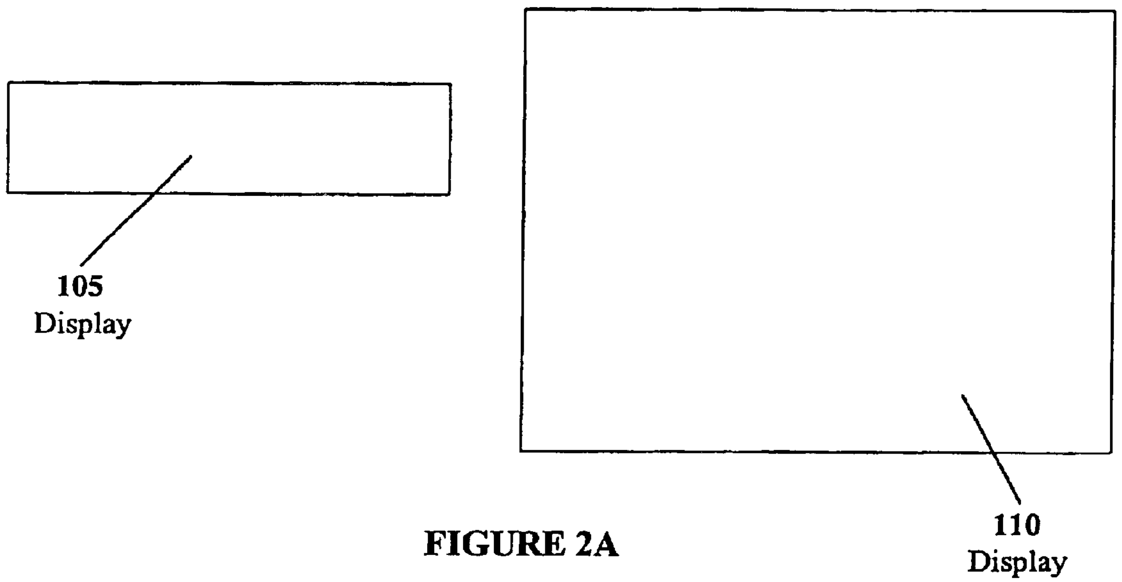
FIGS. 2A–2D are block diagrams of touch screens and displays for some embodiments of the present invention.

FIGS. 2A–2D are block diagrams of touch screens and displays for some embodiments of the present invention. In FIG. 2A, two display screens are shown, a narrow display screen 105 and a display screen 110 with a length to height ratio of about 4 to 3. Traditionally, display screens on player tracking units have used LED's to display a single row of alphanumeric text such as a 16 character display resulting in a narrow display such as 105. A touch screen may be used with an LED display screen to eliminate a key pad on the player tracking unit. However, a color LCD display screen may be preferred over an LED screen to allow for the display of symbols as well as alphanumeric characters. In one embodiment of the present invention, a color LCD display screen with a 3.5 inch diagonal and a resolution of 320 pixels by 240 may be used with a touch screen as a touch screen display. In addition to LCD's and LED's, a touch screen may be used with a plasma display screen, a CRT display as well as with other conventional display technology.

Figure 2B:
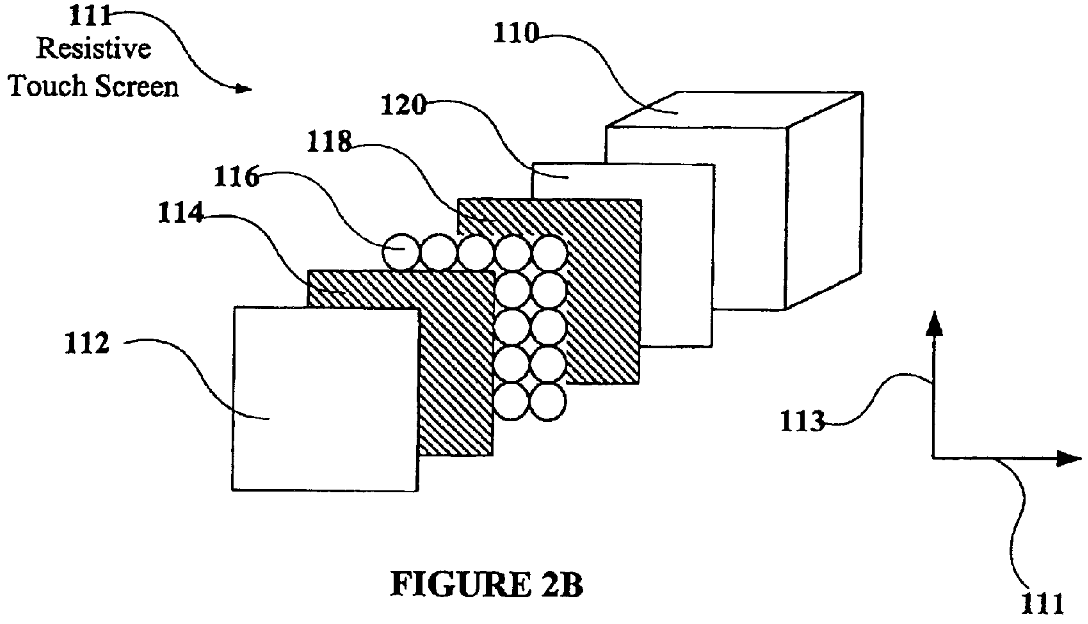
Figure 2C:
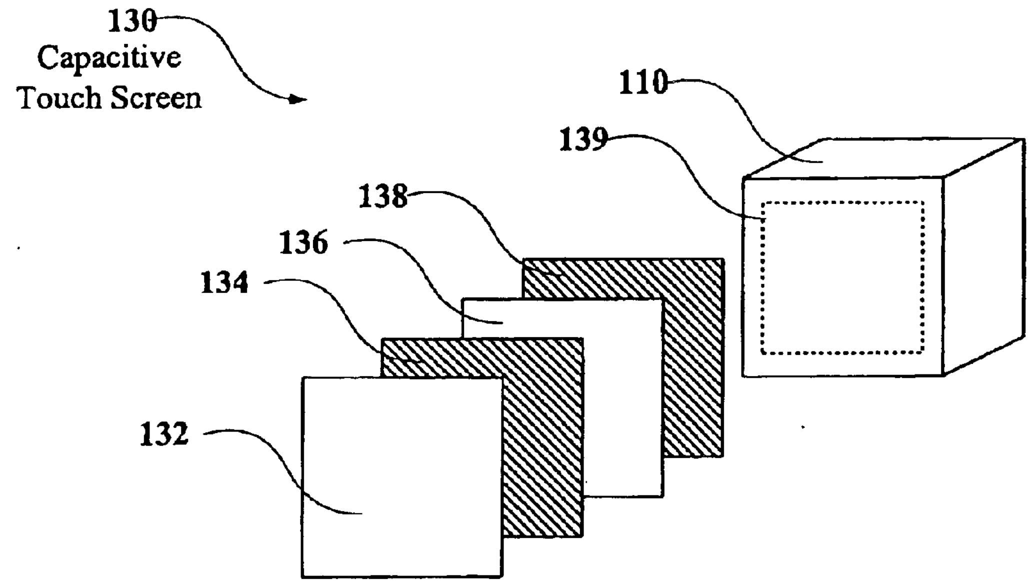
Figure 2D:
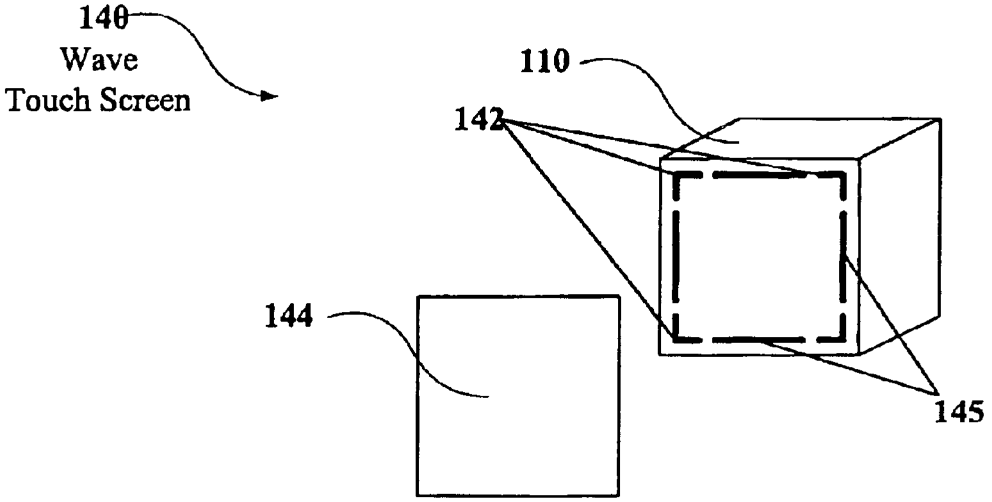

In FIGS. 2B–2D, three embodiments of different types of touch screens, a resistive based touch screen (FIG. 2B), a capacitive based touch screen (FIG. 2C) and a surface acoustic wave touch screen (FIG. 2D) are described. In FIG. 2B, an embodiment of a resistive touch screen 111 integrated with a display 110 is shown. In a resistive touch screen 111, a glass panel 120 is coated with a clear conductive material 118. Polyester spacer dots 116 are used to separate a polyester cover sheet 112 from the glass panel 120 with the conductive material coating 118. An inner surface of the polyester cover sheet 120 in contact with the polyester spacer dots 116 is coated with a conductive metal coating 114. An outer surface of the polyester cover sheet may be covered with a scratch resistant coating (not shown). The glass panel 120 and other layers may be integrated into a touch screen assembly that may be mounted to the display 110 using an adhesive epoxy or some other mounting means.

A touch screen controller (not shown) is used to apply a small voltage gradient across the x-axis 111 of the glass panel 120 and across y-axis 113 of the cover sheet 112 which produces a small current in the panel and the cover sheet. With a voltage applied to the glass panel 120 and cover sheet 112, the layers of the resistive touch screen may be used as a sensor. When a stylus or other implement is used to press the conductive layers, 114 and 118, together, the current flowing across the panel 120 and the cover sheet is altered. Based on the change in current, the touch screen controller determines the x and y coordinates of the stylus contact.

In FIG. 2C, an embodiment of a capacitive touch screen 130 integrated with a display 110 is shown. In a capacitive touch screen 130, a glass panel 136 is coated on both sides with a clear conductive material, 134 and 138. The inner conductive layer 138 may be primarily used for shielding. The outer surface of the touch screen may be a scratch resistant coating 132. Electrodes 139 are uniformly distributed around the edge of the touch screen 130 to apply a low-voltage field uniformly across the outer conductive layer 134. When a finger or a conductive stylus contacts the screen 132, a capacitive coupling occurs with voltage field which causes a small current to be drawn into the finger or the stylus. The current flow from the corners of the touch screen electrodes 139 are measured. The measured current flow is used by the touch screen controller (not shown) to determine the location of the contact on the screen.

In FIG. 2D, an embodiment of a wave touch screen mounted to a display 110 is shown. The screen 144 is an uncoated glass panel. In one type of wave touch screen, transducers 142 in the corners produce ultrasonic waves on the glass panel. The reflectors 145 are used to create a standing wave pattern on the glass panel 144. When a soft-tipped stylus is touched to the surface of the panel 144, the transducers detect the attenuation of the wave, which may be used by a touch screen controller to determine the coordinates of the stylus. In an infrared touch screen, LED's and photoresistors on the edge of the screen are used to create a grid of infrared beams. A stylus or finger may be used to obstruct the beams and the touch screen controller determines the coordinates of the obstruction.

For most embodiments of the present invention, a capacitive based touch screen is preferred but the present invention is not limited to capacitive based touch screens. Capacitive touch screens are very clear, durable and have a high resolution. However, capacitive touch screen are generally more expensive than resistive touch screens. Further, when a finger is used as a stylus on a capacitive touch screen, a small amount of current is drawn into to the finger which some game players may find annoying. Thus, in some embodiments, other touch screen types, such as a resistive touch screen or a wave touch screen, may be employed with the present invention.

The touch screen controller processes signals from the touch screen sensor and passes touch screen event data to one or more gaming devices that utilize the touch screen event data. For instance, the x and y coordinates of a contact point on the touch screen may be used be a processor on a player tracking unit, a master gaming controller or combinations thereof, to allow a user to navigate through a game service interface (see FIGS. 3A–3D) and to enter gaming information. In general, a logic device in communication with the touch screen, such as the processor on the player tracking unit or the master gaming controller, uses a device driver to receive touch screen event data from the touch screen controller. The touch screen controller may be a component separate from the touch screen assembly. The touch screen assembly includes the layers of the touch screen sensor and is mounted onto a display. In one embodiment of the present invention, the touch screen controller is integrated into the touch screen assembly.

FIGS. 3A–3E are block diagram of game service interfaces for some embodiments of the present invention. In each of the figures, a single "page" of the game service interface that may be displayed on a touch screen display of the present invention is shown. However, the game service interfaces are not limited to a single page. Multiple pages may be used with each game service interface to provide a particular game service. Thus, in some embodiments, to utilize a game service interface to receive a game service, a user may be required to navigate through multiple pages.

A component layout for each game service interface is provided for illustrative purposes only and is not limited to the layout in each of the figures. Thus, layout parameters including but not limited to: 1) types of components (i.e., "buttons" and other input areas) included on each page, 2) a size of buttons on each page, 3) a shape of the button on each page (e.g. square, oval, rectangular, star-shaped, n-sided polygon, etc), 4) a color scheme for the buttons, 5) alpha-numeric text or symbols on each button and 6) background color scheme for the interface, may be varied. The input buttons maybe rendered in 2-D. In some embodiments, the layout of pages for a particular game service interface may be customized according to the preferences of an individual player.

In particular embodiments, the buttons may be rendered with surface shading and textures to appear three-dimensional and may be animated. As example of an 3-D animation, when a button is touched on the touch screen, it may appear to move into the screen. Further, the symbols on the buttons may be appear to be animated in 2-D or 3-d. For instance, text on the buttons may appear to flash or move or characters and symbols on the buttons may appear to move. The characters and symbols may be selected according to a theme of a game played on the gaming machine. For instance, for a "little green man" game, an animation of a little green man taking a drink may be used to request a drink on the gaming machine.

An audio layout may also be included with each interface. For example, when a player touches a particular button on a game service interface displayed on the touch screen peripheral device or completes a particular task, a corresponding sound may be projected from an audio device located on the player tracking unit or a gaming machine. The sounds may include but are not limited to music, voice messages (e.g. "welcome" or "thank you") and noises (e.g. buzzing or beeping). In some embodiments, the audio layout may be customized according to the preferences of the user. For instance, voice message may be in a language selected by the player.

Figure 3A:
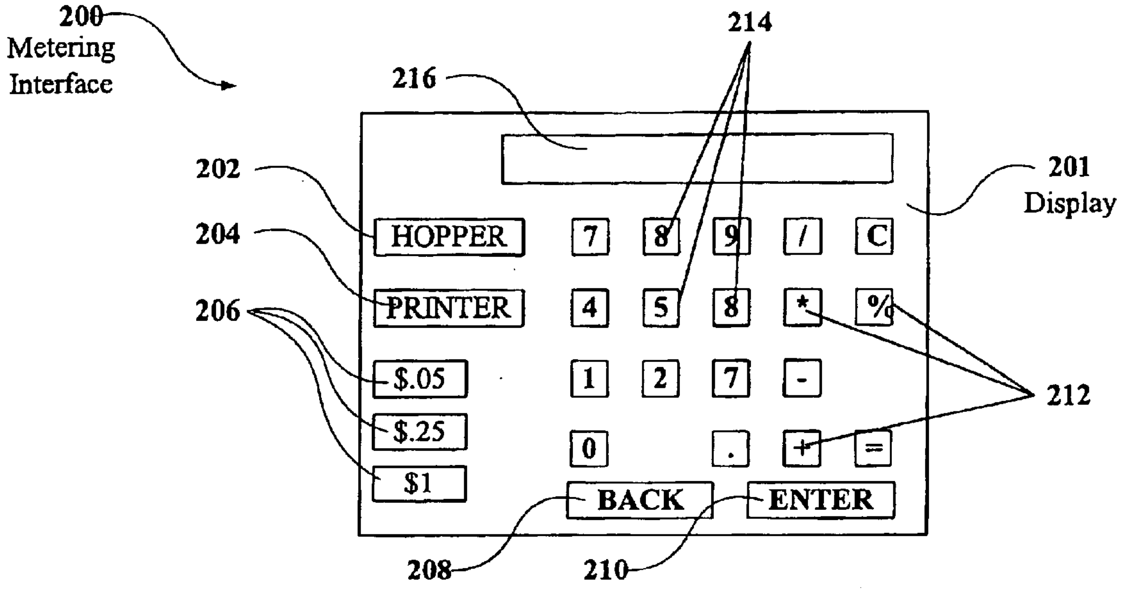
FIGS. 3A–3E are block diagram of game service interface displays for some embodiments of the present invention.

In FIG. 3A, a metering game service interface 200 that may be displayed on a touch screen display 201 is shown. The metering game service interface allows a casino operator to view metering information on the gaming machine. After logging into to the system using metering interface 200 or another interface, the casino operator may use the hopper button 202 to obtain metering information about a hopper on the gaming machine or a printer button 204 to obtain metering information about a printer on the gaming machine that issues printed tickets that may be used to obtain gaming credits on other gaming machines or redeemed for cash. The metering information may be displayed on the display area 216. The casino operator may use calculator buttons 208, 210, 212, 214 to perform arithmetic operations on the metering data. For example, "back" button 208 and "enter" button 210 maybe used to enter data. The arithmetic function buttons 212 and numeric buttons 214 may be used to perform various arithmetic operations. The interface 200 may also include gaming specific function keys. For instance, the function keys 206 may allow the user to convert the metering information to different gaming machine denominations such as a nickel, quarter or dollar machine.

Figure 3B:
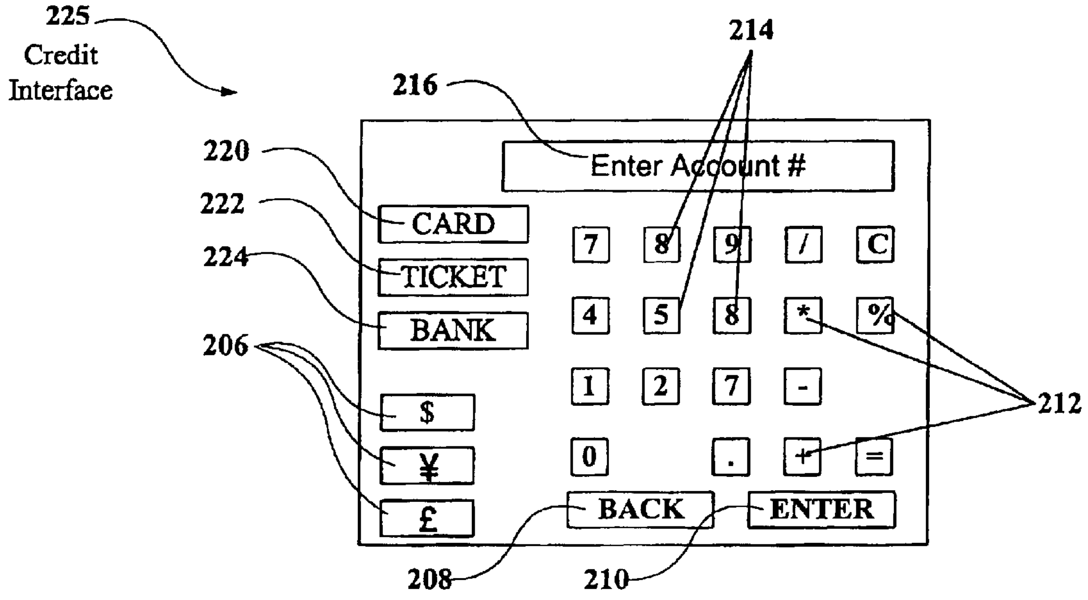

In FIG. 3B, a credit game service 225 that may be displayed on the touch screen display is shown. The credit interface 225 may be used by a player to transfer credits or cash winning to various account accessible to the player. For instance, a player may be able to transfer a portion of their credits or cash to a smart card, a printed ticket or a bank account using the card button 220, the ticket button 222 or the bank button 224. The numeric buttons 214 may be used to enter account information and PIN numbers as well as to perform arithmetic operations. The function keys 226 may be used for currency conversion such as between dollars, pounds and yen. To transfer money to bank account, the player tracking unit or the gaming machine may communicate with the bank via a network connection available to the player tracking unit or gaming machine as described with respect to FIG. 1.

Figure 3C:
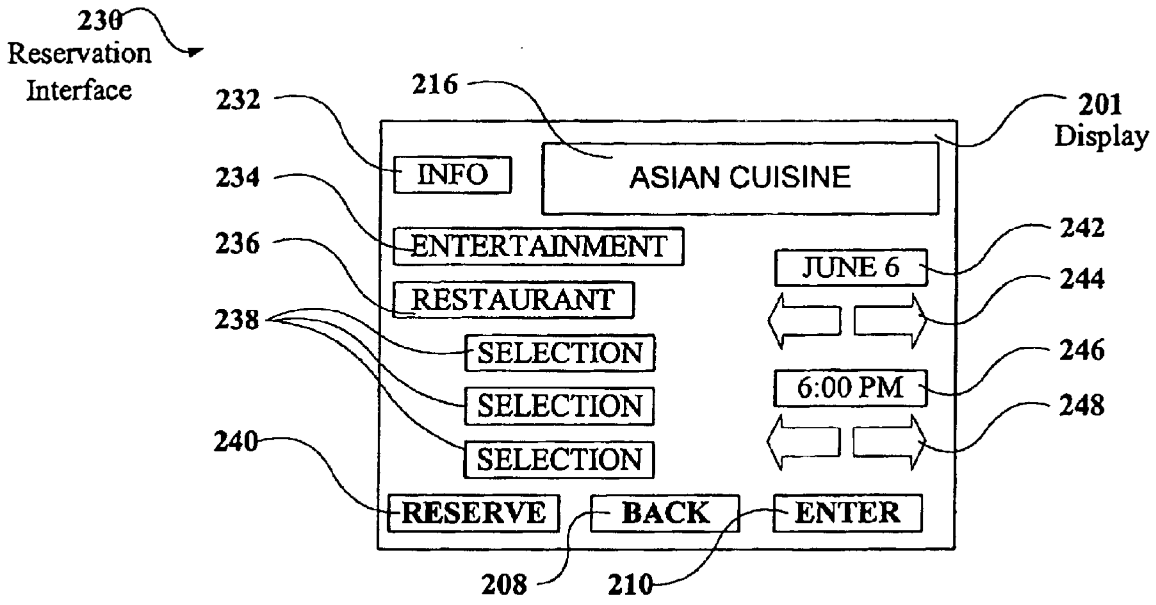

In FIG. 3C, a reservation interface 230 that may be displayed on the touch screen display is shown. The reservation interface may be used by the player to make reservations for food and entertainment at a gaming establishment such as a casino. When the entertainment button 236 or the restaurant button 236 is pressed, different selections in each category may be displayed. When the restaurant button 236 is pressed, three restaurant selections 238 are displayed. When the info button 232 is pressed, information about the entertainment selections or restaurant selections may be displayed in display area 216. For example, the info button 232 may be used to determine one of the restaurant selections serves "Asian Cuisine." Using the date button 242, date selection buttons 244, time button 246 and time selection buttons, a player may select a time and date for a reservation. Then, when the reserve button 240 is pressed, a request for a reservation may be sent to a remote reservation server 65 or another remote device as described with reference to FIG. 1. When the reservation has been confirmed by the remote server, a confirmation message may be displayed on the reservation interface. In some embodiments, when the gaming machine includes a printer, a printed receipt with the reservation may be issued to the player.

The reservation interface 230 as well as other game service interfaces described herein may be not available to all players using the touch screen interface. For example, in some embodiments, only players with a special "status" according to criteria determined by the gaming establishment may be able to access a particular game service interface. For instance, after a certain amount of game play by the player, the player may be presented access to the reservation interface 230 to obtain a free dinner or a show as compensation (e.g. comp) for the amount of their game play.

Figure 3D:
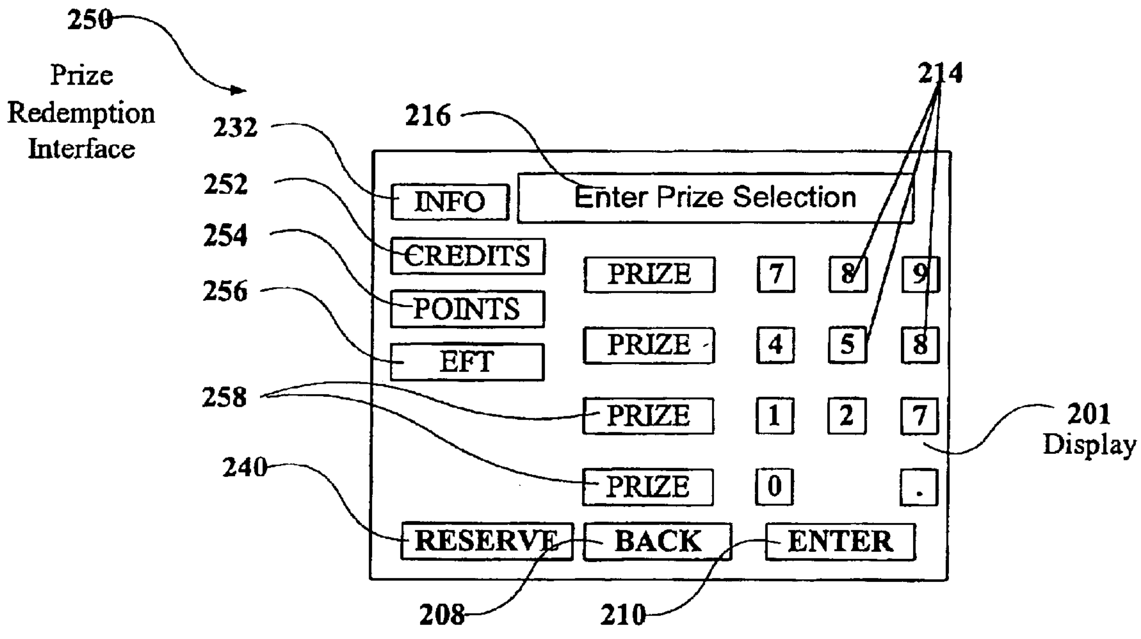
Figure 3E:
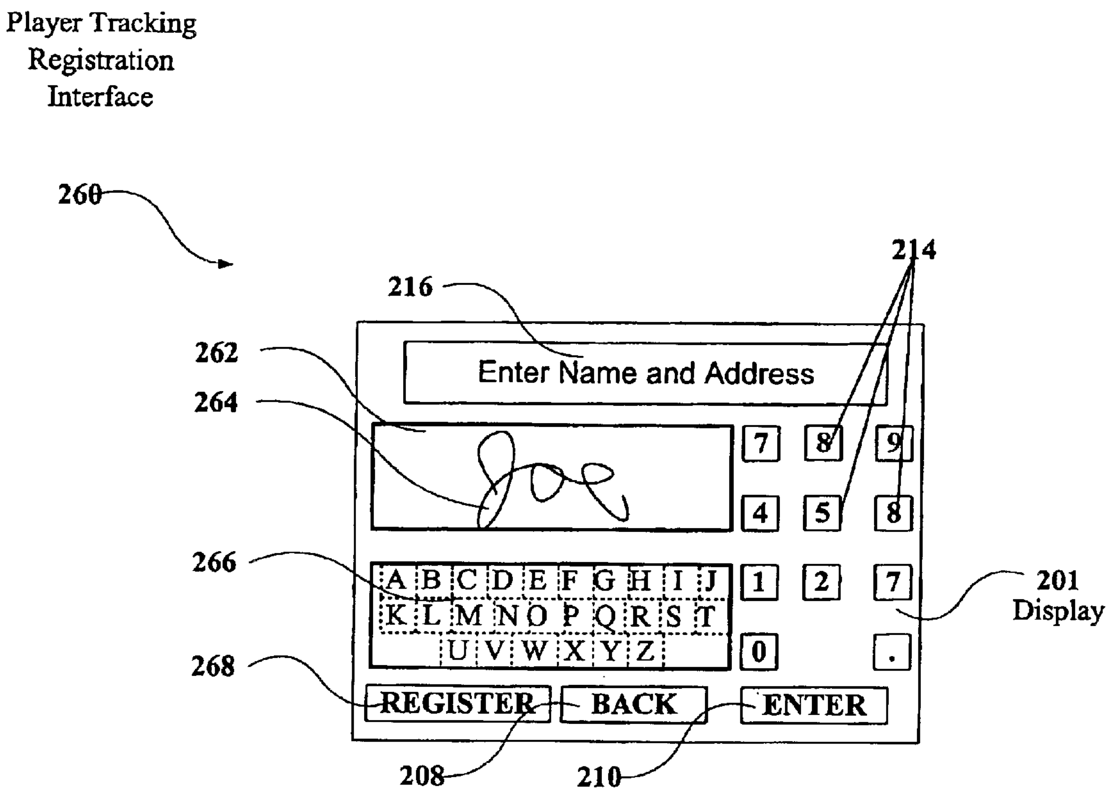

In FIG. 3D, a prize game service interface 225 that may be displayed on a touch screen peripheral device is shown. The prize interface may be used by the player to make redeem prizes awarded on a gaming machine. For instance, prizes may be awarded as: 1) a "jack pot" on a gaming machine, 2) based upon game play history that is tracked as part of a loyalty program or 3) part of a promotion at the gaming establishment. The prize buttons 258 may be pressed to select one of the prizes. When the info button 232 is pressed, information about the prize selection may be displayed in display area 216. Using the credits button 252, points button 254 and EFT (electronic finds transfer) button, a player may used a combination of credits available on the gaming machine, loyalty points and cash from a bank account to redeem a particular prize. The player may use an additional page of the prize redemption interface 250 to enter additional information such as a shipping address.

In FIG. 3E, a loyalty program registration interface 260 that may be displayed on a touch screen peripheral device is shown of the present invention. Using the loyalty program registration interface 260, a player that is not a member of a loyalty program, such as player tracking program, may use the interface 260 to join the program at the gaming machine as part of a "point of play" registration. In one embodiment, the player may obtain a "blank" magnetic striped card or another type of loyalty program instrument excepted by the card reader on the gaming machine such as a smart card. Next at the gaming machine, the player may request a "point of play" registration on the gaming machine from a menu of game services available on the gaming machine. A "point of play" registration on the gaming machine may be initiated before game play session has begun on the gaming machine (e.g. the player registers and then plays one or more games on the gaming machine), during a game play session on the gaming machine (e.g. game play by the player occurs prior to the registration and after the registration) and at the end of a game play session (e.g. the player registers but does not continue to play).

After the "point of play" registration has been initiated on the gaming machine, a logic device on the player tracking unit or the gaming machine may instruct the player to insert the "blank" magnetic striped card into the card reader and display the loyalty program registration interface 260 on the touch screen display. Using a finger or stylus, a player may enter their name, address and other identification information required for registration. Different combinations of registration information may be used and are not limited to a name and address. The required identification information may be entered using the numeric input buttons 214 and the alphabetic input buttons 266. The required information may be input in different languages and is not limited to English or other Romance languages. Thus, the input buttons 266 may be adapted for languages using alphabets other than a Roman alphabet.

In some embodiments, the touch screen display may be used with hand writing recognition software located on a logic device on the player tracking unit, player tracking server or the gaming machine to allow a player to write information on the display screen, such as their name and address, as a means of inputting this information. The "written" information may be converted to text by the hand-writing recognition software and stored electronically. For example, a player name, "JOE" 264 is written in a writing template area 262. The name may be recognized using hand-writing recognition software and converted to text. The required registration information may be written in languages other than English and using an alphabet different than the Roman alphabet such as a Kanji alphabet which is used in Japan.

In addition, the player may sign their name in the writing template area 262. The player's signature may be recorded and stored so that it may be later used for identification purposes. For example, prior to the initiation of a player tracking session or another game service, a signature recorded from the writing template area 262 may be compared with a stored signature using comparison software. When the signatures compare, the player tracking session or other game service is allowed to proceed. When the signatures do not compare, the player tracking session or game service may be terminated or additional identification information may be required from the player before the player tracking session is allowed. Alphabetic input buttons and writing template areas with hand writing recognition and feature recognition software are not limited to the loyalty program registration interface 260 and may be used with any of the other game service interfaces of the present invention.

Besides a signature, other biometric information may be recorded from the player as part of the registration process. For instance, a camera may be used to record a picture of player's face or a retinal scanner may be used to scan an image of a player's retina. As another example, a finger print reader may be used to record a player's finger print. A microphone may be used to record a player's voice. In one embodiment, the biometric information may be used for auditing purposes to identify that a player has actually registered. In another embodiment, the biometric information entered during the registration process may be used to validate a player's identity to initiate a loyalty program session. For instance, a recorded player's finger print may be used to validate the player's identity when they initiate a loyalty program session using a loyalty program instrument. The biometric input devices used in the registration process, such as a camera, finger print reader, a microphone may be located on a player tracking unit, a gaming machine, a casino kiosk or any other gaming device used to register a player.

After the player has entered the required information using the game service interface, the player may touch the register button 268 and a registration request message is sent to the player tracking server. The registration request message contains the information necessary to register the player to the loyalty program such as the identification information entered by the player and identification information from the loyalty point instrument used in the registration process such as a serial number recorded from the magnetic striped card or other identification information recorded on the loyalty point instrument. The registration request message may be generated by a logic device located in the player tracking unit or in the gaming machine such as the master gaming controller. After receiving a confirmation of the registration from the player tracking server, any additional game play on the gaming machine by the player may be recorded on the gaming machine and sent to the player tracking server as part of a player tracking session. In one embodiment, the gaming machine may issue a printed receipt to the player to confirm the registration process.

After registration, the magnetic striped card, or other loyalty point instrument used in the registration process, may be used by the player to initiate a player tracking session on other gaming machines or participate in other loyalty program activities available to the player through the loyal program using the magnetic striped card. Additional details of the point of play registration method of the present invention are described with respect to FIGS. 9 and 10.

The "point of play" registration method, described above, is not limited to touch screen displays located on a player tracking unit. The method may be implemented on a touch screen display used as the main display on the gaming machine or as a secondary display on the gaming machine. In addition, the method may be implemented on a touch screen display located on a casino kiosk. The casino kiosk may include a card reader and baskets containing blank magnetic striped cards or other gaming devices used as a loyalty program instruments. For instance, a smart card or a room key may be used as loyalty program instruments. At the kiosk, the player may use the blank magnetic striped cards and the touch screen display interface to register for a loyalty program such as a player tracking program as described above with respect to the gaming machine.

The "point of play" registration may also be implemented using many different input mechanisms or combinations of input mechanisms to enter a required set of registration information for a loyalty program. The input mechanisms may be located on a gaming machine or other gaming devices (e.g. casino kiosks and handheld wireless devices) used to perform a "point of play" registration. For instance, a user may enter some of the registration information using a microphone and voice recognition software. In another examples, a user may enter registration information using alpha-numeric characters displayed on a display screen and a selection mechanism on the gaming machine to select the characters on the display screen. The selection mechanism may be one or more of the following but is not limited to input buttons, a joystick, a track-ball and a mouse. In yet another example, loyalty program information used in the registration process may be read into the gaming machine from a registration sheet inserted into the bill validator (see FIG. 7).

In one embodiment of the present invention, the player may enter loyalty program registration information for a "point of play" registration using a cell phone carried by the player. The cell phone may be used to communicate directly with the player tracking unit, directly with the gaming machine, with a loyalty program server via a local network or combinations thereof. The player tracking unit or gaming machine may contain an cellular interface for communicating with a player's cell phone. Information stored on the cell phone such as the cell phone number and the owner of the cell phone may be downloaded to the player tracking unit as a means of identifying a player for a player for a "point of play" registration in a loyalty program. The cell phone may also be used as an interface to enter additional gaming information required to perform a point of play registration. In addition, after registration, an individual loyalty program registration phone number may be provided to the player. The player may store loyalty program registration phone number on their cell phone. Later, the player may use their cell phone to implement a loyalty program session on a gaming machine by dialing their loyalty program registration number. After establishing a loyalty program session using their cell phone, the player may also use their cell phone to access loyalty program information such as a loyalty program account balance. Thus, the cell phone may be used as a loyalty program instrument.

As another method of entering loyalty program information and loyalty program instrument information on the gaming machine, a bill validator or ticket reader (see FIG. 7) may be used to read information from a registration sheet filled out by the player. In one embodiment, the registration sheet may be a Scantron sheet™ (Scantron Corporation, Tustin, Calif.). The Scantron sheet may have blanks and bubbles that are filled in by the player. Then, the player may feed the Scantron sheet into a bill acceptor on a gaming machine which reads the information recorded on the Scantron sheet.

The Scantron sheet may be read by bill acceptors and ticket readers that are part of a cashless gaming system. In a cashless gaming system, a cashless instrument, such as a printed ticket, may be used to record game credits or a cash amount. The credits or cash amount recorded on the ticket may be used for game play in a gaming machine or redeemed for cash after validation by the cashless gaming system. In general, a cashless gaming system includes a cashless system server connected to a number of gaming devices that are used to issue and validate cashless instruments. Thus, when a cashless system is used in the registration process, a player may be able to perform a "point of play registration" at any location in the cashless gaming system that accepts and validates cashless instruments, such as printed tickets, that are used as part of the cashless system. Details of cashless gaming system are described in copending U.S. application Ser. No. 09/648,382, filed Aug. 25, 2000, by Rowe, titled "An Award Ticket Clearinghouse," which is incorporated in its entirety and for all purposes.

After the bill acceptor or the ticket reader scans the data from the registration sheet, the gaming device connected to the bill acceptor or ticket reader may generate a registration request message with the loyalty program information obtained from the registration sheet and send the registration request message to a loyalty program server. In a cashless system, the gaming device may be a gaming machine, a clerk validation terminal or a cashier station connected to the cashless system server. The cashless system server may also be used as a loyalty program server or may be in communication with a loyalty program server. The loyalty program server stores the loyalty program information to a loyalty program database. Then, the loyalty program server may generate and return a temporary user ID/password to the gaming device.

After receiving the temporary user ID and password, the gaming device, such as a gaming machine or a clerk validation terminal, then may print out a transaction receipt that is used a "temporary card". (A permanent card can be mailed to the patron's home address at a later date.) The temporary card may be used as a loyalty point instrument. The temporary card may use a bar-code to represent the player's loyalty program account information or another information format may be used to record this information. The temporary card may be used to initiate a loyalty program session by inserting it into the bill acceptor or ticket reader on a gaming machine. The bill acceptor pulls the temporary card in, reads the loyalty program information, and returns it to the player. The gaming machine then establishes a loyalty program session using the information obtained from the temporary card.

In one embodiment of the present invention, a permanent loyalty program card later issued to the player may be compatible with the bill validator or ticket reader on a gaming machine. The permanent loyalty program card may have information recorded in a format that is readable by the card reader or the ticket reader on a gaming machine. For instance, account information may be recorded in a bar code format or a text format depending on the capabilities of the bill validator. In another example, a bar-code scanner may be included on the gaming machine. The bar code scanner may be used to read account information from the player tracking card. When a bill validator or bar-code reader is used to initiate a loyalty program session, an advantage of the present invention is that the card reader and associated hardware on the gaming machine may be eliminated.

In yet another embodiment of the present invention, the point of play registration may be initiated by a casino service representative. When a player is playing a game on the gaming machine and has not initiated a player tracking session, a light (see FIGS. 4A and 4B) on the player tracking unit may indicate that the player may be a valuable to the casino as a member of their loyalty program such as their player tracking program. For example, when the player has bet an amount of money over some amount of time determined by the casino, the light on the player tracking unit may be activated. As another example, a player may press a function button on the player tracking unit to request a "point of play" registration which activates a light or another signaling device on the gaming machine. A passing casino service representative may notice the light or another signaling device and inquire whether the player would like to enroll in a player tracking program.

In some embodiments, the casino service representative may enter the player's registration information on a touch screen display located on a hand-held wireless device, such as a PDA (personal digital assistant) carried by the casino service representative. Using the hand-held wireless device, the casino service representative may enter "point of play" registration information such as a player's name, address, signature, finger-print, preference information and combinations thereof. The handheld wireless device may include a touch pad for recording a player's signature and a platen for recording a player's finger print. Preference information may include but is not limited to types of drinks a player's like, types of games that they prefer and wagering preferences. In other embodiments of the present invention, a hand-held wireless device, such as a PDA, carried by the player may be player may be used to enter "point of play" registration information without assistance from a casino service representative.

When a loyalty program instrument is issued during the registration process, after receiving the loyalty program information from the player (also can be prior to receiving the loyalty program information), the casino service representative may obtain loyalty program instrument information from a loyalty program instrument that will be issued to the player. For instance, when magnetic striped card is issued to a player as a loyalty program instrument such as a player tracking card. The casino service representative may insert swipe the card through a card reader attached to their hand-held wireless computing device (e.g. a PDA) to obtain the loyalty program instrument information such as a card serial number. The magnetic striped card may also have the card serial number encoded as a bar code on the card. In this case, the casino service representative may read the bar code with a scanner attached to the hand-held wireless device. The loyalty program information and the loyalty program instrument information may be included in a registration request message sent to a loyalty program server.

The hand-held wireless device may communicate with player tracking unit, the gaming machine or directly with the loyalty program server using a wireless communication standard such as but not limited to Bluetooth, IrDA (Infrared Direct Access), IEEE 802.11a, IEEE 802.11b, IEEE 802.11x, hiperlan/2, and HomeRF. After entering the required information, a registration request message may be sent through a wire interface or a wireless interface on the player tracking unit to the player tracking server (see FIG. 4B), through a wireless interface on the gaming machine to the player tracking server or directly to the player tracking server from the hand held-device. After receiving a registration confirmation from the player tracking server, the player may be presented with an activated player tracking card which may be used to initiate a player tracking session on the gaming machine. An example of hand-held wireless device that may be used to provide the "point of play" player tracking registration is described in co-pending U.S. application Ser. No. 09/544,844, by Rowe, filed Apr. 7, 2000, tilted "Wireless Gaming Environment," which is incorporated herein in its entirety and for all purposes.

IrDA is a standard for devices to communicate using infrared light pulses. A hand-held device, such as a PDA may communicate with the player tracking unit and the gaming machine using infrared light pulses using the IrDA communication standard or some other infrared communication standard. An infrared interface on the player tracking unit or located on the gaming machine may be used to receive the infrared pulses from a device communicating using infrared pulses. Generally, infrared communications using IrDA requires line of sight communications.

The game service interfaces described above have been presented for illustrative purposes only as many other types of game service interfaces may be used with the touch screen displays of the present invention. For example, game service interfaces may be used that allow a player to specify various game playing preferences. As described above, some of these preferences may be recorded when a "point of play" loyalty program registration is performed. Additional details of these interfaces, which may be used in the present invention, are described in co-pending U.S. patent application Ser. No. 09/819,152, by Paulsen, filed Mar. 27, 2001, titled "Interactive Game Playing Preferences", which is incorporated herein in its entirety and for all purposes. As another example, a player may use the touch screen display and a game service interface to select different entertainment content sources, such as video programs, audio programs and Internet based services. The display screen may be used to display entertainment content such as a movie, a sporting event, advertising and other promotions. For Internet based services, the display with a touch screen may be used to operate a web-browser and other web-based applications. A few examples of entertainment content sources and interfaces, including Internet-based entertainment content sources, that may be provided with the touch screen display of the present invention are described in co-pending U.S. patent application no. 09/665,526, by Nelson, et al, filed on Sep. 9, 2000, and titled "Play Per View," which is incorporated herein in its entirety and for all purposes. In yet another example, a player may use a game service interface to select promotions available to the player and receive a printed coupon used to obtain the promotion.

Figure 4A:
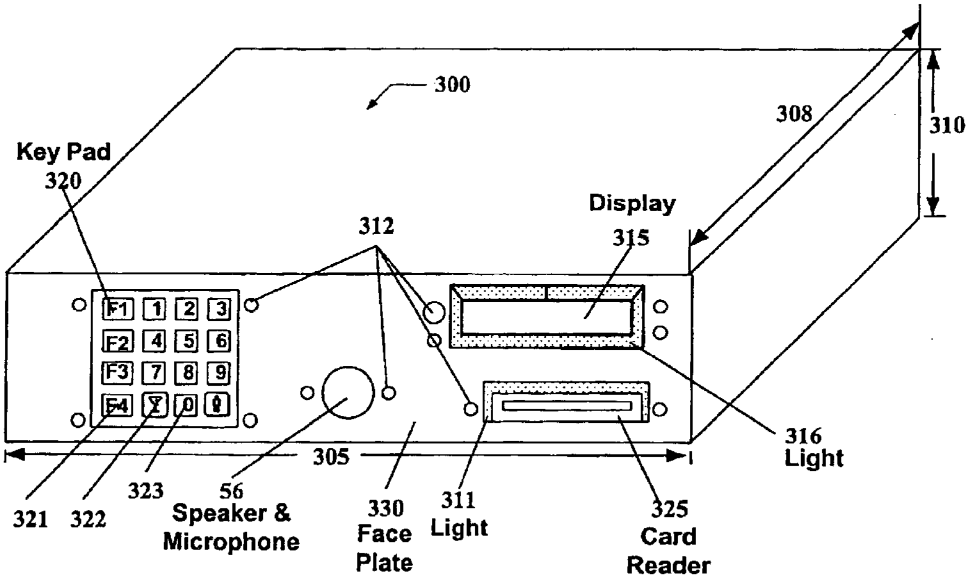
FIGS. 4A and 4B are perspective diagrams of player tracking units of the present invention.
Figure 4B:
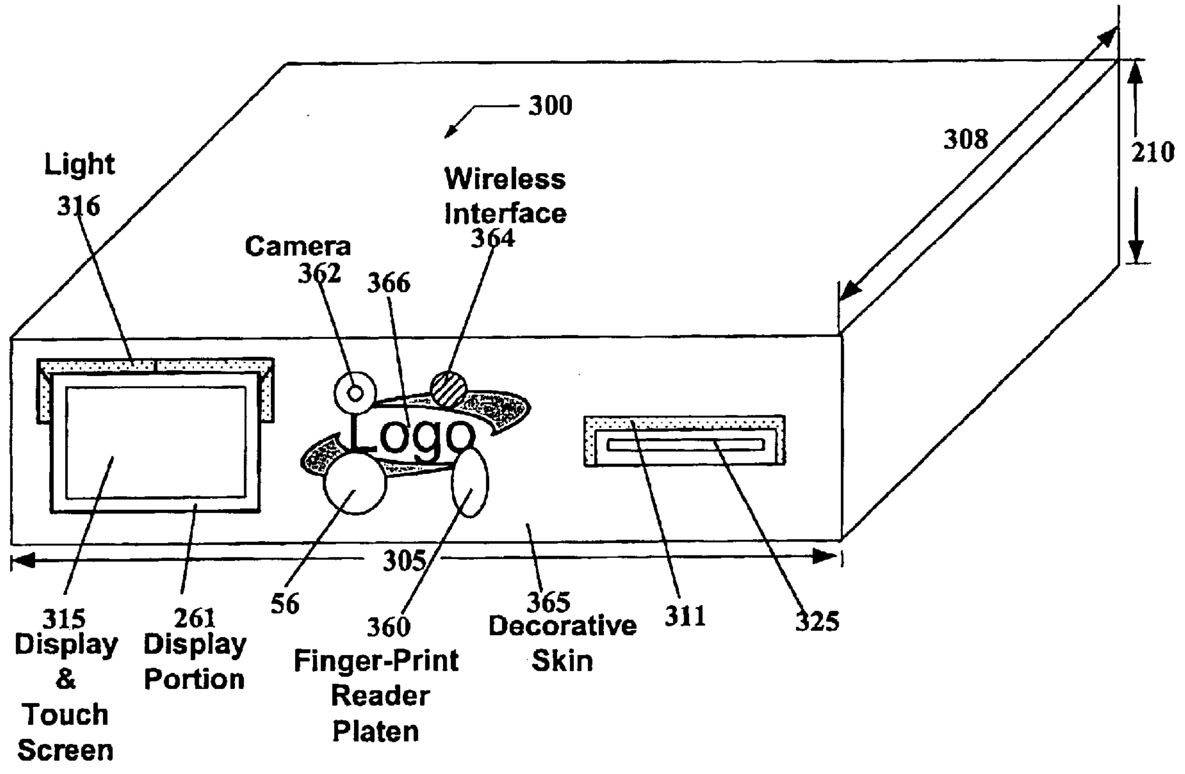

FIGS. 4A and 4B are perspective diagrams of different embodiments of player tracking units of the present invention. FIG. 4A is a front diagram for a housing or chassis 300 enclosing a number of interface peripherals. The interface peripherals may be used to provide input and output (I/O) to a player tracking system or may be used to provide I/O to other gaming systems such as a gaming machine. The device housing 300 may enclose a logic device (see FIG. 5) and other electronics configured to execute player tracking functions or the logic device may be enclosed in a logic device housing separate from the device housing 300.

Using the player tracking interface devices enclosed in the housing 300, gaming information, such as player tracking information, may be input to the player tracking unit and gaming information may be visually and aurally communicated to various individuals that may use the player tracking unit, such as game players, casino service representatives and maintenance technicians. The device housing 300 encloses a touch screen display 315, a key pad 320, a speaker/microphone 56, a card reader 325, a light 311 adjacent to the card reader 325 and a light 316 adjacent to the touch screen display 315. In other embodiments, the housing 300 may enclose many different combinations of player tracking interface devices. For instance, additional gaming devices, such as biometric input devices, wireless interface devices cameras and bonus buttons, may also be enclosed in the device housing (see FIG. 4B). In one embodiment, face plate 330 surrounds the display 315, the key pad 320, the card reader 325, the light 316, the light 311 and the speaker 56. The face plate 330 may include mounting holes, such as 312, for mounting various player tracking interface devices to the face plate 330 such as the touch screen display 315.

The face plate 330 includes cut-outs (not shown) that may allow access to the player tracking interface devices. For instance, a front portion of the light 316, a front portion of the touch screen display 315, and a front portion of the key pad are visible through the face plate 330. Each of the key pad buttons, such as 321, 322 and 323, may be back-lit by illumination devices of some type. The illumination devices, behind the key pad buttons, may be independently controlled to display various light and color patterns. The light and color patterns may be used to represent game information.

The dimensions of the device housing 300, (e.g. 305, 308 and 310) are shown in FIGS. 2A and 2C. The device housing 300 is shown as a rectangular box for illustrative purposes only. A shape of the device housing 300 is variable and is not strictly limited to rectangular shapes. Further, dimensions of the cut-outs on the face plate 330 for the player tracking interface devices may vary depending the manufacturer of a particular interface peripheral device which may be used as a player tracking device. Typically, the dimensions of player tracking interface devices vary from manufacturer to manufacturer.

The light 316, adjacent to the touch screen display 315 may use one or more illumination devices. Further, the light 316 may employ one or more types of lighting systems such as light emitting diodes (LED's), neon bulbs, incandescent bulbs, halogen bulbs, florescent bulbs, electro-luminescent lighting elements or combination thereof. In a particular embodiment, the LED's may be multi-colored LED's. The light may extend substantially surround the touch screen display 315 or the light may extend around a portion of the perimeter of the touch screen display. Illumination devices within light 316 may be used to indicate different types of gaming information. For instance, the light 316 may be used to indicate a player has inserted their card incorrectly into the card reader 325. The light 316 may be activated to signal a passing casino service representative to initiate a "point of play registration," as described with reference to FIG. 3E.

The touch screen display 315 may be an LED, LCD, vacuum florescent, plasma display screen or any other type of display technology. The touch screen display 315 may employ one of the touch screen sensors, preferably but not limited to a capacitive sensor, with a touch screen controller integrated into the touch screen assembly as described with reference to FIGS. 2A–2D. The touch screen display 315 may be used to display additional symbols or gaming information that may be used to enhance player tracking services and other related gaming services. For instance, a drink button 322 is used on the key pad 320 for a player to request a drink. Additional drink symbols or text names may be displayed on the touch screen display 315 to allow a player to select a particular type of drink.

FIG. 4B is a front diagram for a housing or chassis 300 enclosing a number of interface peripherals which may be used as player tracking interface devices, for one embodiment of the present invention. The front plate 330 is covered with a decorative skin 365 with a silk-screen logo 366. In addition to the peripheral interface devices described with respect to FIG. 4A, the player tracking housing 300 includes a wireless interface 364, a camera 362 and a finger-print reader with platen 360.

In one embodiment, the touch screen display 315 is a color LCD. The touch screen display 315 may be used to implement a game service interface as described with respect to FIGS. 3A–3E. In addition, the touch screen display 315 is used to replace the key pad 320. More specifically, the touch screen display may be used as an interface by a player to: 1) input player tracking identification information, 2) view account information and perform account transactions for accounts such as player tracking accounts and bank accounts, 3) receive operating instructions related to the player tracking unit and the gaming machine, 4) redeem prizes or comps including using player tracking points to redeem the prize or comp (see FIG. 3D), 5) make entertainment service reservations (see FIG. 3C), 6) transfer credits to cashless instruments and other player accounts (see FIG. 3B), 7) participate in casino promotions, 8) select entertainment choices for output via video and audio output mechanisms on the player tracking unit and the gaming machine, 9) play games and bonus games, 10) request gaming services such as a drink orders, 11) communicate with other players or casino service personnel, 12) play progressive games and 13) register a player for a loyalty program such as a player tracking club (see FIG. 3E). In addition, the touch screen display 315 may be used as an interface by casino service personnel to: a) access diagnostic menus, b) display player tracking unit status information and gaming machine status information, c) access gaming machine metering information (see FIG. 3A) and d) display player status information.

The camera 362 may be used for security purposes, promotional purposes and to enter biometric information. For instance, the camera 362 may deter tampering with a player tracking unit or gaming machine. As another example, a picture of a player may be recorded when they win a jackpot and used for a promotion. As another example, the camera may be used with feature recognition software to identify the player. Further, in some embodiments, the camera 362 may be used to record an image of a player's retina for identification purposes. Similarly, the finger-print reader 360 may be used to read a player's fingerprint which is used to determine their identity. As another example, the microphone 56 may be used with voice recognition software to recognize a player's voice for player authentication purposes. Thus, a voice signal input into the microphone may be compared with a stored voice print to identify the player. In some embodiments, biometric input devices may be used to supplement information read from a card inserted in the card reader or to even replace the card reader 325.

Biometric information input using the camera 362, finger-print reader 360 or microphone may also be used as part of the "point of play" registration method. For instance, when a player attempts to register for a loyalty program such as a player tracking program at the gaming machine, a picture of the player's face or retina may be taken by the camera or a finger print may be recorded using the finger print reader 360. The information may be used for future identification of the player or for security purposes.

The wireless interface 364 may be used to communicate with a portable wireless device worn or carried by a player, a casino service representative or maintenance technician. For example, rather than inserting a card into the card reader 325, a player may wear or simply carry a wireless communication device that may be about the size of a player tracking card. When the player is near the machine, a wireless interface device 364 and the wireless device worn by the player may automatically detect each other and establish communications. The communication connection allows gaming information to be transferred between the wireless devices. As another example, the wireless interface 364 may be used to communicate with a wireless device carried by a casino service representative such as a hand-held device used for a "point of play" registration of a game player at the gaming machine.

The wireless interface device 364 may use a wireless communication standard such as Bluetooth™ to communicate with portable wireless devices using this standard. The Bluetooth communicates on a frequency of 2.45 Gigahertz. Typically, Bluetooth devices send out signals in the range of 1 milliwatt. The signal strength limits the range of the devices to about 10 meters and also limits potential interference sources. Interference is also limited by using spread-spectrum frequency hopping. For instance, a device may use 79 or more randomly chosen frequencies within a designated range that change on a regular basis up to 1,600 times a second. Thus, even if interference occurs, it is likely only to occur for a short period of time.

When Bluetooth-capable devices come within range of one another, an electronic conversation takes place to determine whether they have data share or whether one needs to control the other. The connection process is performed automatically. Once a conversation between the devices has occurred, the devices form a network. Bluetooth systems create a Personal-Area Networks (PAN) or "piconets". While the two or more devices in a piconet remain in range of one another, the distances between the communications devices may vary as the wireless devices are moved about. Once a piconet is established, such as between the wireless interface device 364 and a portable wireless device, the members of the piconet randomly hop frequencies in unison so they remain in touch with another and avoid other piconets that may be operating in proximity to the established piconet. When Bluetooth is applied in a casino environment, many such piconets may be operating simultaneously. Details of the Bluetooth™ standard and the Bluetooth™ special interest group may be found at www.bluetooth.com. Other wireless standards that may be used with the present invention include but are not limited to IRDA, IEEE 802.11a, IEEE 802.11b, IEEE 802.11x (e.g. other IEEE 802.11 standards such as IEEE 802.11c, IEEE 802.11d, IEEE 802.11e, etc.), hiperlan/2, and HomeRF.

In another embodiment of the present invention, the microphone and speaker 56 may be used to input gaming information and aurally communicate gaming information. For instance, the microphone 56 may be used with voice recognition software executed by: a) a logic device on the player tracking unit or b) a master gaming controller in a gaming machine, may be used recognize verbal requests for gaming services. For instance, the player may request a drink by saying "order me a drink" into the microphone The speaker 56 may be used to aurally communicate gaming information to the player or someone else using the gaming machine. For instance, when a card has been inserted incorrectly in the card reader 325. A message, such as "card not inserted correctly," may be projected from the speaker. Simultaneously, although not required, the light 316 may flash red to draw the player's attention. As another example, as part of a "point of play" registration, a player may be able to speak their name, address and other required information into the microphone 56. The voice information from the player may be used to request a player tracking program registration from a player tracking server as described with respect to FIG. 3E. The voice recognition software may be used in combination with the touch screen display. For example, information entered by the player from speaking may be converted to text and then may be displayed on the touch screen display 315. A game service interface on the touch screen display 315 may be used to correct errors in text converted from a player's voice input.

Voice messages from the speaker 56 may be projected in different languages. For example, for a Japanese speaking game player messages may be in Japanese, for a Spanish speaking game player the messages may be in Spanish while for an English speaking player the messages may be in English. The language preferred by the player may be stored as player tracking information on a player tracking card or the player may be able to specify their language using one of the input devices on the player tracking unit. The player tracking information on the player tracking card may be based on a user profile previously established by the player which may be used to select the language used by the player.

FIG. 5 is a block diagram of an embodiment of a player tracking unit 300 of the present invention connected to a master gaming controller 54 (see FIG. 1) on a gaming machine and a player tracking server 62. The player tracking unit 300 includes a logic device 410 and a number of player tracking interface devices 411 including a card reader 325, a display 315, a touch screen 416, a light panel 316, a speaker/microphone 56, a wireless interface and other player tracking interface devices 456.

The logic device 410 may include a processor for executing software allowing the player tracking unit to perform various player tracking functions such as communicating with the player tracking server 62, communicating with the master gaming controller 54 or operating the various peripheral devices such as the card reader 325, the display 315, the touch screen and the light panel 316. For instance, the logic device 410 may send messages containing player tracking information or game service interfaces to the display 315 and may receive input invents from the touch screen 416. As another example, the logic device 410 may send commands to the light panel 316 to display a particular light pattern and to the speaker/microphone 56 to project a sound to visually and aurally convey game information. The logic device 410 may utilize a microprocessor and/or microcontrollers. For instance, the light panel 316 may include a microcontroller that converts signals from the processor 402 to voltage levels for one or more illumination devices. In one embodiment, application software for the player tracking unit 300 and configuration information for the player tracking unit may be stored in a memory device such as an EPROM 408, a non-volatile memory, hard drive or a flash memory.

The player tracking unit may include a memory 416 configured to store: 1) player tracking software 414 such as data collection software, 2) player tracking communication protocols (e.g. 420) allowing the player tracking unit 300 to communicate with different types of player tracking servers, 3) device drivers for many types of player tracking interface devices (e.g. to communicate with the touch screen controller), 4) voice recognition software for receiving voice commands from the microphone 56, 5) software for displaying different game service interfaces, 6) software for generating a "point of play" registration request and 7) industry standard communication protocols (e.g. 440) such as TCP/IP, USB, Firewire, IEEE1394, IrDA or Bluetooth allowing the player tracking unit to communicate with devices using these protocols and proprietary communication standards such as Netplex and SAS (IGT, Reno, Nev.) allowing the player tracking unit to communicate with devices using these protocols. Typically, the master gaming controller, such as 54, communicates using a serial communication protocol. A few examples of serial communication protocols that may be used to communicate with the master gaming controller include but are not limited to USB, RS-232 and Netplex (a proprietary protocol developed by IGT, Reno, Nev.).

A plurality of device drivers may be stored in memory 316 for each type of player tracking device. For example, device drivers for five different types of card readers, six different types of displays and eight different types of touch screens may be stored in the memory 416. When one type of a particular peripheral device is exchanged for another type of the particular device, a new device driver may be loaded from the memory 416 by the processor 402 to allow communication with the device. For instance, one type of card reader in the player tracking unit 300 may be replaced with a second type of card reader where device drivers for both card readers are stored in the memory 416.

In some embodiments, the software units stored in the memory 416 may be upgraded as needed. For instance, when the memory 416 is a hard drive, new device drivers or new communication protocols may be uploaded to the memory from the master gaming controller 54, the player tracking server 62 or from some other external device. As another example, when the memory 416 is a CD/DVD drive containing a CD/DVD designed or configured to store the player tracking software 414, the device drivers and other communication protocols, the software stored in the memory may be upgraded by replacing a first CD/DVD with a second CD/DVD. In yet another example, when the memory 416 uses one or more flash memory units designed or configured to store the player tracking software 414, the device drivers and other communication protocols, the software stored in the flash memory units may be upgraded by replacing one or more flash memory units with new flash memory units storing the upgraded software.

A minimal set of player tracking software applications 414, communication protocols 440, player tracking communication protocols and device drivers may be stored on in the memory 416. For instance, an operating system, a communication protocol allowing the player tracking unit 300 to communicate with a remote server such as the player tracking server 62 and one or more common player tacking applications may be stored in memory 416. When the player tracking unit is powered-up, the player tracking unit 300 may contact a remote server 62 and download specific player tracking software from the remote software. The downloaded software may include but is not limited to one or more particular player tracking applications that are supported by the remote server, particular device drivers, player tracking software upgrades, and a particular communication protocol supported by the remote server.

Details of this method are described in co-pending U.S. application Ser. No. 09/838,033, filed on Mar. 19, 2001, by Criss-Puskiewicz, et al., entitled, "UNIVERSAL PLAYER TRACKING SYSTEM," which is incorporated herein in its entirety and all for purposes In some embodiments, the player tracking functions may be implemented by both the logic device 410 and the master gaming controller 54. For instance, the master gaming controller may execute voice recognition software to interpret voice commands input from the microphone 56. As another example, the master gaming controller 54 may execute software for displaying game service interfaces on the display 315 and may receive touch screen events from the touch screen 416. For example, the master gaming controller may execute software for a game service interface allowing a "point of play" registration for a player tracking program. Thus, player tracking software such as the player tracking protocols may be stored on a memory located on the gaming machine which is separate from the player tracking unit. In some embodiments, the player tracking software stored on the memory on the gaming machine may be executed by the master gaming controller 54 on the gaming machine. In other embodiments, the player tracking software stored on the memory on the gaming machine may be executed by the logic device 410 on the player tracking unit.

The logic device 410 includes a network interface board 406 configured or designed to allow communication between the player tracking unit 300 and other remote devices such as the player tracking server residing on local area networks, such as a casino area network, a personal area network such as a piconet (e.g. using Bluetooth), or a wide area network such as the Internet. The network interface board 406 may allow wireless or wired communication with the remote devices. The network interface board may be connected to a firewall 412. The firewall may be hardware, software or combinations of both that prevent illegal access of the gaming machine by an outside entity connected to the gaming machine. The internal firewall is designed to prevent someone such as a hacker from gaining illegal access to the player tracking unit or gaming machine and tampering with it in some manner. For instance, an illegal access may be an attempt to plant a program in the player tracking unit that alters the operation of the gaming machine allowing it to perform an unintended function.

The communication board 404 may be configured to allow communication between the logic device 410 and the player tracking interface devices including 325, 315, 416, 316, 56 and 456 and to allow communication between the logic device 410 and the master gaming controller 54. Additional details of communication between the processor 402, display 315 and touch screen 416 are described with reference to FIG. 6. The wireless interface 364 may be used to allow the player tracking unit and possibly the master gaming controller 54 to communicate with portable wireless devices or stationary devices using a wireless communication standard. The wireless interface 364 maybe connected to an antenna 357. In some embodiments, the wireless interface 364 may be incorporated into the communication board 404. In addition, in some embodiments, the logic device 410 and the master gaming controller 54 may communicate using a non-proprietary standard wireless communication protocol such as Bluetooth, IrDA, IEEE 802.11a, IEEE 802.11b, IEEE 802.11x (e.g. other IEEE 802.11 standards such as IEEE 802.1c, IEEE 802.11d, IEEE 802.11e, etc.), hiperlan/2, and HomeRF, or using a non-proprietary standard wired communication protocol such as USB, Firewire, IEEE 1394 and the like. In other embodiments, the logic device 410 and the master gaming controller may communicate using a proprietary communication protocol used by the manufacturer of the gaming machine such as Netplex.

The communication between the player tracking unit 400 and 1) the player tracking interface devices 411, 2) the master gaming controller 54, 3) the player tracking server 62 and 4) any other external or internal gaming devices may be encrypted. In one embodiment, the logic device 410 may poll the player tracking interface devices for information. For instance, the logic device 410 may poll the card reader 325 to determine when a card has been inserted into the card reader or may poll the touch screen 416 to determine when the touch screen has been touched. When polled, the touch screen may send the coordinate location of a touch location on the touch screen sensor. In some embodiments, the player tracking interface devices 411 may contact the logic device 410 when a player tracking event such as a card being inserted into the card reader or the touch screen 416 being touched has occurred.

The logic device 410, using an appropriate device driver, may send instructions to the various player tracking interface devices to perform specific operations. For instance, after a card has been inserted into the card reader 325, the processor logic device may send a "read card" instruction to the card reader, "display game service interface A" instructions to the display 315 and a "good luck" voice message to speaker 54. In addition, the logic device 410 may be configured to allow the master gaming controller 54 to send instructions to the player tracking interface devices via the logic device 410. As an example, after a card has been inserted into the card reader 325, the processor logic 410 may determine that the card is for a gaming application controlled by the master gaming controller 54 and send a message to the master gaming controller 54 indicating a card has been inserted into the card reader. For instance, when a player has requested a "point of play registration," a registration interface may be displayed on the main display with a touch screen on the gaming machine rather than on a touch screen display on the player tracking unit. In response, to the message from the logic device, the master gaming controller 54 may send a series of commands to the player tracking interface devices such as a "read card" instruction to the card reader 325, a flash light pattern "A" command to the light panel 316, and a "display message" instruction to the display 315 via the logic device 410. The instructions from the master gaming controller 54 to the player tracking interface devices may be obtained from gaming application software executed by the master gaming controller 54. The gaming application software may or may not be related to player tracking services.

The player tracking unit 300 may include one or more standard peripheral communication connections (not shown). The logic device 410 maybe designed or configured to communicate with the master gaming controller 54 and the player tracking interface devices using a standard peripheral connection, such as an USB connector, and using a standard communication protocol, such as USB. Details of using a standard peripheral communication connection are described in co-pending U.S. patent application Ser. No. 09/414,659, filed Oct. 6, 1999, by LeMay, et al., entitled, "STANDARD PERIPHERAL COMMUNICATION," which is incorporated herein in its entirety and for all purposes.

In one embodiment, the peripheral devices 411 on the player tracking unit such as the display 315 and the touch screen 416 may communicate using both wired and wireless communications. For instance, the processor 402 may communicate with the touch screen 416 via a USB connector and using a USB communication protocol. However, the master gaming controller 54 may communicate directly with the touch screen 416 or may communicate with the touch screen 416 through the communication board 404 using a wireless communication protocol such as Bluetooth, IrDA, IEEE 802.11a, IEEE 802.11b, IEEE 802.11x (e.g. other IEEE 802.11 standards such as IEEE 802.11c, IEEE 802.11d, IEEE 802.11e, etc.), hiperlan/2, and HomeRF.

FIG. 6 is a block diagram of processor board with a touch screen display in a player tracking unit for one embodiment of the present invention. The player tracking unit communicates with a display 514 and touch screen 516 using a PC-like architecture. The player tracking CPU 402 communicates with memory control chip set 502 and RAM 504 via the local micro-processor bus. A bus interface unit 506 provides an interface between the microprocessor bus and a PCI bus 512 and provides an interface between the microprocessor bus and an ISA bus 522. An Ethernet interface 508 is located on the PCI bus 512. The Ethernet interface allows communication with a local area network (LAN) at 10/100 MB communication rates. The processor 402 may communicate with a player tracking server and other gaming devices located on the LAN via the Ethernet interface 508.

A display controller 510 for the touch screen display 514 is also located on PCI bus 512. The display controller interprets instructions from the processor 402 that allow video content such as game service interfaces, video streaming, games, bonus games, video conferencing, advertising, movies, television programs and web-browsers to be displayed on the display 514. The touch screen controller 518, which is integrated into the touch screen assembly, operates the touch screen sensor, such as by applying a voltage, and interprets touch screen inputs. For example, for a capacitive touch screen sensor, a voltage change in the sensor as the result of a touch may be converted to x and y coordinates or pixel locations by the touch screen controller 518. The touch screen controller sends touch screen event data to an I/O controller 520 via a serial connection 522. The serial connection between the touch screen controller 18 and the I/O controller may be a wire connection that employs USB, RS232, PS/2, Firewire or IEEE1394 or a wireless connection that employs wireless connection standard such as Bluetooth, IRDA, IEEE 802.11a, IEEE 802.11b, IEEE 802.11x (e.g. other IEEE 802.11 standards such as IEEE 802.11c, IEEE 802.11d, IEEE 802.11e, etc.), hiperlan/2, and HomeRF.

The I/O controller 520 sends touch screen events received from the touch screen controller to the bus interface unit 506 via the ISA bus 522 and on to the processor 402. A legacy network interface may be connected to the ISA Bus 522. The legacy network interface allows the processor to communicate with gaming devices connected to the player tracking unit using legacy communication protocols such as fiber optic, current loop (IGT proprietary standard) and RS-485.

Turning to FIG. 7, more details of using a player tracking system in the context of game play on a gaming machine are described. In FIG. 7, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. A touch screen may be mounted over the display monitor 34 and game service interfaces may be displayed on the touch screen monitor. The information panel 36 may be a back-lit, silk screened glass panel with lettering to indicate general game information including, for example, the number of coins played. The bill validator 30, player-input switches 32, video display monitor 34, and information panel are devices used to play a game on the game machine 2. The devices are controlled by circuitry (see FIG. 1) housed inside the main cabinet 4 of the machine 2. Many possible games, including traditional slot games, video slot games, video poker, video black jack, video keno, video pachinko, lottery games and other games of chance as well as bonus games may be provided with gaming machines of this invention.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which may print bar-coded tickets 20 used as cashless instruments. A secondary display 44 which may also include a touch screen is mounted in the top box. The secondary display 44 may also be used to operate game service interfaces.

The player tracking unit mounted within the top box 6 includes a touch screen display 22 for entering player tracking information, displaying player tracking information and displaying game service interfaces. The player tracking unit also includes a card reader 24 for entering a magnetic striped card containing player tracking information and a speaker/microphone 42 for projecting sounds and inputting voice data. In addition, the player tracking unit may include additional peripheral interface devices such as biometric input devices as described with respect to FIGS. 4A and 4B.

Understand that gaming machine 2 is but one example from a wide range of gaming machine designs on which the present invention may be implemented. For example, not all suitable gaming machines have top boxes or player tracking features. Further, some gaming machines have two or more game displays—mechanical and/or video. And, some gaming machines are designed for bar tables and have displays that face upwards. Still further, some machines may be designed entirely for cashless systems. Such machines may not include such features as bill validators, coin acceptors and coin trays. Instead, they may have only ticket readers, card readers and ticket dispensers. As another example, a game may be generated in on a host computer and may be displayed on a remote terminal or a remote computer. The remote computer may be connected to the host computer via a network of some type such as the Internet. Those of skill in the art will understand that the present invention, as described below, can be deployed on most any gaming machine now available or hereafter developed.

Returning to the example of FIG. 4, when a user wishes to play the gaming machine 2, he or she inserts cash through the coin acceptor 28 or bill validator 30. In addition, the player may use a cashless instrument of some type to register credits on the gaming machine 2. For example, the bill validator 30 may accept a printed ticket voucher, including 20, as an indicia of credit. As another example, the card reader 24 may accept a debit card or a smart card containing cash or credit information that may be used to register credits on the gaming machine. Further, as described above, the bill validator 30 may be used to read information from a registration sheet, such as a Scantron sheet, during a "point of play" registration process. In addition, the bill validator 30 may be used to read information from a loyalty program instrument inserted into the bill validator 30, such as a bar-code. In some embodiments, the loyalty program information read by the bill validator 30 may be used to initiate a loyalty program session.

Prior to beginning a game play session on the gaming machine 2, a player may insert a player tracking card into the card reader 24 to initiate a player tracking session. In some embodiments, after inserting their card, the player may be visually prompted on the display screen 22 or aurally prompted using the speaker to enter identification information such as a PIN code using the touch screen display 22. Typically, the player tracking card may remain in the card reader 24 during the game play session. As another example, the gaming machine may transfer player tracking information from portable wireless device worn by the player via a wireless interface device (not shown) on the gaming machine 2. An advantage of using a portable wireless device is that the transfer of player tracking information is automatic and the player does not have to remember to correctly insert a player tracking card into the gaming machine.

In a player tracking session on the gaming machine, features of the player's game play during a game play session on the gaming machine, such as an amount wagered during the game play session, may be converted to player tracking points and stored in the player's player tracking account on a player tracking server. Later, accumulated player tracking points may be redeemed for rewards or "comps" for the player such as free meals or free rooms. Usually, the player tracking card inserted into the card reader contains at least player tracking account information. When the card is inserted correctly into the card reader 24, the information stored on the card, such as the player's account information, may be read by the card reader and transferred by a logic device on the player tracking unit (see FIG. 5) to the player tracking server. The player tracking account information allows the player tracking server to store player tracking points accumulated during the game play session to the appropriate account. When player tracking information is not provided by the player, for instance, when the player tracking card has been inserted incorrectly into the card reader 24 or the player is not a member of a player tracking program, player tracking points are not accumulated. However, using the methods described with respect to FIGS. 3E, 9 and 10, when a player is not a member of the player tracking program, the player may register at the gaming machine.

During the course of a game, a player may be required to make a number of decisions, which affect the outcome of the game. For example, a player may vary his or her wager on a particular game, select a prize for a particular game, or make game decisions which affect the outcome of a particular game. The player may make these choices using the player-input switches 32, the video display screen 34 or using some other device which enables a player to input information into the gaming machine. Certain player choices may be captured by player tracking software loaded in a memory inside of the gaming machine. For example, the rate at which a player plays a game or the amount a player bets on each game may be captured by the player tracking software.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2, from lights behind the belly glass 40 or the light panel on the player tracking unit 44.

After the player has completed a game, the player may receive game tokens from the coin tray 38 or the ticket 20 from the printer 18, which may be used for further games or to redeem a prize. Further, the player may receive a ticket 20 for food, merchandise, or games from the printer 18. The type of ticket 20 may be related to past game playing recorded by the player tracking software within the gaming machine 2. In some embodiments, these tickets may be used by a game player to obtain game services or as a receipt for game service transactions made on the gaming machine.

Figure 8:
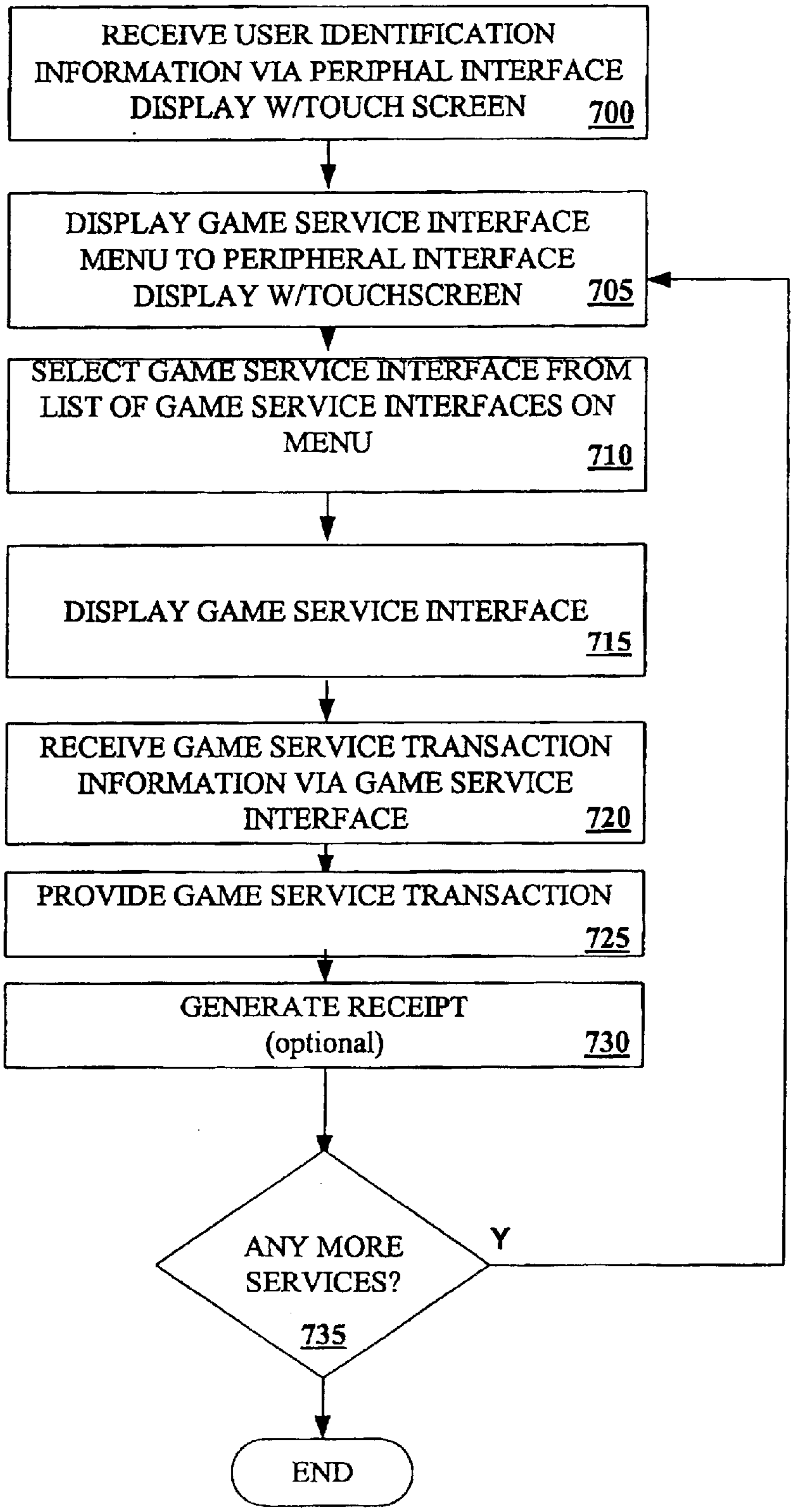
FIG. 8 is a flow chart of a method for providing gaming services on a touch screen display of the present invention.

FIG. 8 is a flow chart of a method for providing gaming services on a touch screen display of the present invention. In 700, a user, such a game player or a casino operator, may enter identification information via a touch screen display. For instance, a PIN number may be entered via a key pad displayed on the touch screen display, a player may "sign-in" by providing a signature via the touch screen display or combinations thereof. In 705, a game service interface menu may be displayed to the touch screen display. The game service interface menu may allow the user to select from a number of game service interface available to the user. The game service interface menu may be user specific. For instance, a casino operator may have access to different game service interfaces than a game player. As another example, a "special" status game player, as determined by a gaming establishment, may have access to special game service interfaces not available to every game player.

In 710, a game service interface is selected from the game service interface menu using the touch screen display. In 715, the selected game service interface is displayed. For instance, the selected game service interface may allow a player to join a player tracking program at a gaming machine. In 720, a processor, providing player tracking services, may receive a number of touch screen events via the game service interface that may be converted into game service transaction information. The location of touches on the touch screen display may allow the processor to generate game service transaction information and instructions. For instance, as part of a "point of play registration," a player may type in their name and address by touching the touch screen at locations where different alpha-numeric symbols are displayed.

In 725, based upon information entered by the user, a game service or game service transaction may be provided. As an example of a game service, the user may be to view selected video content on the touch screen display. As examples of game service transactions, the user may be registered in a player tracking program, redeem a prize, or transfer credits to one or more cashless instruments such as printed ticket. In 730, a receipt may be optionally generated as a record of the game service transaction provided. The receipt may be printed on a printer located on the gaming machine. As examples, the receipt may be a coupon for a promotion requested by the player or an entertainment reservation made by the player. In 735, the user may have the option to request access to another game service interface. When the user requests access to another game service interface, the game service interface menu may be re-displayed according to 705.

FIG. 9 is a flow chart of a method for providing a "point of play" loyalty program registration on a gaming machine of the present invention. In FIG. 9, the method is implemented on a gaming machine. However, as described with respect to FIG. 3E, the method may be implemented on gaming devices such as a hand-held wireless device or a casino kiosk.

In 800, a request to register a player for a loyalty program is detected. The registration request may be initiated using a touch screen interface located on a player tracking display, main display or secondary display on the gaming machine. Further, the registration request may initiated using another input mechanism on the gaming machine such as input buttons or a key pad available on the gaming machine. In one embodiment, the registration request may be initiated automatically by the gaming machine. For instance, when a player is not involved in a player tracking session during a game play session on the gaming machine, the gaming machine may initiate a registration request based upon the amount a player has wagered over a time period during the game play session. The gaming machine may initiate the request by displaying a message to the player asking them if they would like to register for a loyalty program.

In 805, a game service interface is displayed on a touch screen peripheral interface available on the gaming machine such as on but not limited to the player tracking unit. In 810, information from a loyalty program instrument such as a magnetic striped card, smart card, room key or a portable wireless device may be read into to the gaming machine. For instance, in one embodiment, to register for a player tracking program, a blank magnetic striped card may be inserted into a card reader on the gaming machine to read a serial number on the card. In 815, the user may enter identification information, such as a name and address, via the registration touch screen interface which is received by a processor located on the gaming machine such as in the player tracking unit or in the master gaming controller. When the user has completed entering the information, an input button on the touch screen display such as "register" button may be touched (see FIG. 3E).

In 818, the information entered by the user is checked. In 816, when additional information is required, a message may be sent to the touch screen display with a request for the missing information. In 820, when the user has entered the required registration information, a registration request message is generated by a processor on the gaming machine and sent to a playing tracking server. The registration request message may include loyalty program information and information obtained from the loyalty program instrument such as the serial number from the magnetic striped card. The loyalty program information used in the registration process may include but is not limited to a name, an address (e.g. business or residential address), a birth date, an age, a sex, a phone number, an e-mail address and preference information (e.g., preferred drinks, preferred games, preferred promotions, etc.). In some embodiments, the network connection to the player tracking server may be unavailable. In this case, the processor may store the registration request message and send it when the player tracking server becomes available.

In 825, the gaming machine receives a registration reply from the player tracking server. In 830, the gaming machine determines if the registration has been confirmed from the registration reply message. In 845, when the registration has not been confirmed, a message may be displayed to the player indicating the registration request was denied with a reason for the denial. For instance, the registration may denied because the player is already registered for the player tracking program. In 833, when the registration has been confirmed by the player tracking server, a confirmation message may be displayed to the player and a player tracking session may be initiated on the gaming machine 840. In 835, a receipt, with information used to indicate the registration has occurred, may be generated by the gaming machine and issued to the player.

In another embodiment of the present invention, the player may enter loyalty program information without using a touch screen interface. As described above, many different types of input mechanisms located on the gaming machine or in communication with the gaming machine may be used to enter loyalty program information and loyalty program instrument information used in the registration process. For instance, as describe above, a player may fill out a registration sheet with loyalty program information. The registration sheet may also include loyalty program instrument information such as a bar code or a serial number. When the registration sheet is inserted into the bill validator on the gaming machine, loyalty program information and loyalty program instrument information recorded on the registration sheet may be read by the bill validator and used in the "point of play" registration process.

The registration sheet may include a loyalty program card. After loyalty program information and loyalty program instrument information recorded on the registration sheet is processed by the bill validator and a "point of play registration" has been completed, the registration sheet may be ejected by the bill validator and the loyalty program card may be detached from the registration sheet and used as loyalty point instrument to initiate a loyalty program session on a gaming machine. In another embodiment, the registration sheet may be stored by the bill validator as a record of the registration process and a printed ticket may be issued by a printer on the gaming machine. The printed ticket may include information read from the registration sheet and may be used as a loyalty program instrument. For instance, the printed ticket may be inserted into a bill validator or ticket reader on a gaming machine to initiate a loyalty program session.

In yet another embodiment, a casino service representative may implement a "point of play" loyalty program registration at a gaming machine using a hand-held wireless device. Using the hand-held wireless device, the casino service representative may enter loyalty program information used in the registration process, such as a player's name, address and PIN number, and may also enter loyalty program instrument information, such as a serial number on a player tracking card. For instance, the hand-held device may include a scanner for reading information from a magnetic stripe on a loyalty program instrument or a scanner for reading a bar-code on a loyalty program instrument. The loyalty program information and loyalty program instrument information may be sent in a registration request message generated by the hand-held wireless device to a loyalty program server. The registration request message may be sent directly to the loyalty program server via a network access point used by the hand-held wireless device or may be sent to the loyalty program server via a gaming machine. After the registration process is complete, the player may use the registered loyalty program instrument to implement a loyalty program session on the gaming machine.

After registration, the player may use the registered loyalty program instrument, such as a magnetic striped card or smart card, at other gaming machines to initiate a loyalty program sessions such as player tracking sessions. One advantage of the registration process described above is that it may be implemented at a gaming machine without a player having to locate a special area where registrations are performed. Another advantage of the registration process is that it may be completed at the gaming machine. Thus, a player does not have to perform any additional steps such as filling out a registration form and mailing it to a processing center which decreases the likely hood of a successful registration.

In some embodiments, the loyalty program instrument used during the registration process may be a permanent membership card that may be used by the player to participate in the loyalty program. In other embodiments, the loyalty program instrument used during the registration may be temporarily used by the player until a permanent membership card is mailed to the player. For instance, a ticket with a bar-code input into a bill validator on the gaming machine may be used as a temporary card.

FIG. 10 is a flow chart of a method for providing a "point of play" loyalty program registration on a loyalty program server, such as a player tracking server, of the present invention. In 900, the loyalty program server receives a registration request message from a gaming device. The gaming device may be at least one of a gaming machine, casino kiosk or hand-held wireless device. In the gaming machine, a logic device in a player tracking unit or the master gaming controller may generate the registration request message. The sent message may be encrypted by the gaming device and then decrypted by the loyalty program server. The message contents and the message sender may also be validated in some manner before the registration request is processed. In one embodiment, loyalty program information and loyalty program instrument information used to register a player in a loyalty program may be entered into a hand-held wireless device by a casino service representative. The handheld wireless device may be generate a registration request message and send it directly to the loyalty program server or send it to the loyalty program server via another gaming device such as a gaming machine.

In 905, the loyalty program server may compare identification information and instrument information contained in the registration request message with information stored in a loyalty program account database containing loyalty program account information. In 910, the loyalty program server may determine if the player is already a member of the loyalty program program. In 915, when the player is already registered, a registration reply message may be generated and sent to the gaming device indicating that the registration was denied because the player is already a member of the program.

In 920, when the player is not a member of the loyalty program program, the loyalty program server may generate a new loyalty program account using the loyalty program information and loyalty program instrument information contained in the registration request message. The new account information may be stored in the loyalty program account database. The identification information may include biometric information such as a scanned fingerprint, a retina image, a picture, a voice print or a signature that may be stored in the new loyalty program account. In 925, a registration reply message, which may include a confirmation or denial of the registration request, is generated by the loyalty program server and sent to the gaming device. In 930, a PIN number may later be sent to the player.

When the registration request has been confirmed, the loyalty program server may receive loyalty program account information generated during a loyalty program session. For instance, after the registration of a player to a loyalty program on a gaming machine, such as a player tracking program, the player may begin a game play session on the gaming machine where the point of play registration occurred or on another gaming machine. The game play session may include wagers on one or more games played on the gaming machine. Loyalty program information generated during the game play session, such as an amount wagered, may be tracked by the gaming machine as part of a loyalty program session for the game player just registered in the loyalty program. During the loyalty program session, the master gaming controller or a player tracking unit on the gaming machine may send the game play information to a loyalty program server. The loyalty program server may use the loyalty program information to determine loyalty points for the game player and store the loyalty points in the new loyalty point account of the newly registered game player.

The method described above in FIG. 10 may be implemented on a loyalty program server such as player tracking server (see FIG. 1). The loyalty program server may include a memory storing loyalty program account information in a database, a memory for executing gaming logic and a network interface for communicating with a plurality of gaming devices such as gaming machines, player tracking units, casino kiosks and hand-held wireless devices. The network interface may send messages over a wire network, a wireless network or combinations thereof. The gaming logic may include programming instructions to implement the method described in FIG. 10 as well as other functions of the loyalty program server.

Although the foregoing invention has been described in some detail for purposes of clarity of understanding, it will be apparent that certain changes and modifications may be practiced within the scope of the appended claims. For instance, while the gaming machines of this invention have been depicted as upright models having top box mounted on top of the main gaming machine cabinet, the use of gaming devices in accordance with this invention is not so limited. For example, gaming machine maybe provided without a top box or the gaming machine may be of a slant-top or table top design.

What is claimed is:

1. A method of registering a player to a loyalty program at a gaming machine used to play one or more games of chance:

detecting a request to register a player to a loyalty program at the gaming machine wherein the request to register the player is for allowing the player to join the loyalty program;

receiving loyalty program information;

receiving instrument information stored on an instrument at the gaming machine wherein the instrument is not associated with a loyalty program account in the loyalty program and wherein the instrument information identifies the instrument;

sending a registration request message including the loyalty program information and the instrument information from the gaming machine to a loyalty program server;

wherein the loyalty program information and the instrument information are for registering the player in the loyalty program by generating a new loyalty program account and wherein after completing the registration of the player in the loyalty program, the instrument becomes a loyalty program instrument operable for initiating a loyalty program session that uses the new loyalty program account during subsequent game play.

2. The method of claim 1, further comprising:

encrypting the registration request message.

3. The method of claim 1, further comprising:

receiving a registration reply message.

4. The method of claim 3, comprising:

when the registration reply contains information confirming the registration request, initiating a loyalty program session on the gaming machine using the loyalty program instrument.

5. The method of claim 3, further comprising:

decrypting the registration reply message.

6. The method of claim 1, further comprising:

displaying a registration interface to a touch screen display and receiving loyalty program information using a touch screen mounted over the touch screen display.

7. The method of claim 6, wherein the touch screen display is a main display on the gaming machine.

8. The method of claim 6, wherein the touch screen display is a secondary display on the gaming machine.

9. The method of claim 6, wherein the touch screen display is located on a player tracking unit.

10. The method of claim 1, further comprising:

generating a receipt at the gaming machine wherein the receipt is for confirming that the player has been registered in the loyalty program.

11. The method of claim 1, further comprising:

displaying a message confirming the registration request.

12. The method of claim 1, further comprising:

displaying a message denying the registration request.

13. The method of claim 1, wherein the loyalty program information is selected from the group consisting of a name, an address, a phone number, an age, a birth date, an e-mail address, biometric information, preference information and combinations thereof.

14. The method of claim 13, wherein the biometric information is selected from the group consisting of a finger print, a retina image, a voice print, a picture and a signature.

15. The method of claim 1, further comprising:

receiving a wager for a game of chance and presenting the game of chance on the gaming machine.

16. The method of claim 1, wherein the game of chance is selected from the group consisting of video slot games, mechanical slot games, video blackjack games, video poker games, video keno games, video bingo games, video machine games, video card games, a video games of chance and combinations thereof.

17. The method of claim 1, wherein the loyalty program is a player tracking program.

18. The method of claim 1, wherein the loyalty program server is a player tracking server.

19. The method of claim 1, wherein the instrument information is at least one of a bar code and a serial number.

20. The method of claim 1, wherein the instrument is selected from the group consisting of a magnetic-striped card, a cell phone, a smart card, a ticket, a room key and a hand-held computing devices.

21. The method of claim 1, further comprising:

generating a registration request message.

22. The method of claim 1, wherein the loyalty program information is input into the gaming machine using a bill validator.

23. The method of claim 1, wherein the instrument information is input into the gaming machine using a bill validator.

24. The method of claim 23, wherein the loyalty program information is input to the bill validator using a Scantron™ sheet.

25. The method of claim 1, further comprising:

printing a first loyally program instrument that is operable to initiate a loyalty program session during the subsequent game play.

26. The method of claim 1, further comprising receiving player identification information from the instrument wherein the player identification information is used as loyalty program information.

27. A method of registering a player to a loyalty program using a gaming device:

receiving loyalty program information on the gaming device;

receiving instrument information stored on an instrument on the gaming device wherein the instrument is not associated with a loyalty program account in the loyalty program and wherein the instrument information identifies the instrument;

sending a registration request message with the loyalty program information and the instrument information from the gaming device to a loyalty program server;

wherein the loyalty program information and instrument information is for registering the player in the loyalty program and wherein a successful registration enrolls the player in the loyalty program by generating a new loyalty program account and wherein, after completing the registration of the player in the loyalty program, the instrument becomes a loyalty program instrument operable for initiating a loyalty program session that uses the new loyalty program account during subsequent game play.

28. The method of claim 27, wherein the gaming device is at least one of a casino kiosk, a player tracking unit and a hand-held computing device.

29. The method of claim 27, further comprising:

displaying a registration interface to a touch screen display on the gaming device and receiving loyalty program information using a touch screen mounted over the touch screen display.

30. The method of claim 27, further comprising:

encrypting the registration request message.

31. The method of claim 27, further comprising:

receiving a registration reply message.

32. The method of claim 31, further comprising:

decrypting the registration reply message.

33. The method of claim 27, further comprising:

generating a registration request message.

34. The method of claim 27, further comprising:

generating a receipt at the gaming device wherein the receipt is for confirming that the player has been registered in the loyalty program.

35. The method of claim 27, wherein the loyalty program information is selected from the group consisting of a name, an address, an age, a birth date, a phone number, an e-mail address, biometric information, preference information and combinations thereof.

36. The method of claim 27, wherein the loyalty program is a player tracking program.

37. The method of claim 27, wherein the loyalty program sewer is a player tracking server.

38. The method of claim 27, wherein the instrument information is at least one of a bar code and a serial number.

39. The method of claim 27, wherein the loyalty program instrument is selected from the group consisting of a magnetic-striped card, a smart card, a cell phone, a ticket, a room key and a hand-held computing device.

40. The method of claim 27, further comprising:

initiating a loyalty program session on a gaming machine using the loyalty program instrument.

41. The method of claim 27, wherein the registration request message is sent from the gaming device to the loyalty program server using a communication interface on a gaming machine.

42. The method of claim 27, further comprising receiving player identification information from the instrument wherein the player identification information is used as loyalty program information.

43. A method of registering a player to a loyalty program in a loyalty program server, the method comprising:

receiving a registration request message including loyalty program information and instrument information from a gaming machine wherein the instrument information is from an instrument not associated with a loyalty program account in the loyalty program and wherein the instrument information identifies the instrument;

generating a new loyalty program account using the loyalty program information and the instrument information that allows the instrument to become a loyalty program instrument operable for initiating a loyalty program session that uses the new loyalty program account during subsequent game play; and sending a registration reply message to the gaming machine wherein the registration reply message comprises information for allowing a loyalty program session to begin on the gaming machine using the new loyalty program account.

44. The method of claim 43, further comprising:

assigning a personal identification number to the player.

45. The method of claim 43, further comprising:

storing the player identification information and the instrument information in a loyalty program account database.

46. The method of claim 43, further comprising:

generating the registration reply message.

47. The method of claim 43, further comprising:

encrypting the registration reply message.

48. The method of claim 43, further comprising:

decrypting the registration request message.

49. The method of claim 43, further comprising:

receiving loyalty program information from a gaming machine for the new loyalty program account;

determining loyalty points using the loyalty program information; and storing the loyalty points to the new loyalty program account.

50. The method of claim 43, wherein the loyalty program is a player tracking program.

51. The method of claim 43, wherein the loyalty program server is a player tracking server.

52. The method of claim 43, wherein the instrument information is at least one of a bar code and a serial number.

53. The method of claim 43, wherein the instrument is selected from the group consisting of a magnetic-striped card, a smart card, a ticket, a room key and a band-held computing device.

54. The method of claim 43, wherein the loyalty program information is selected from the group consisting of a name, an address, magnetic information, preference information and combinations thereof.

* * * * *